Feb. 24, 1959          L. IMBLUM          2,874,586
AUTOMATIC TRANSMISSION
Filed April 11, 1955          15 Sheets—Sheet 1
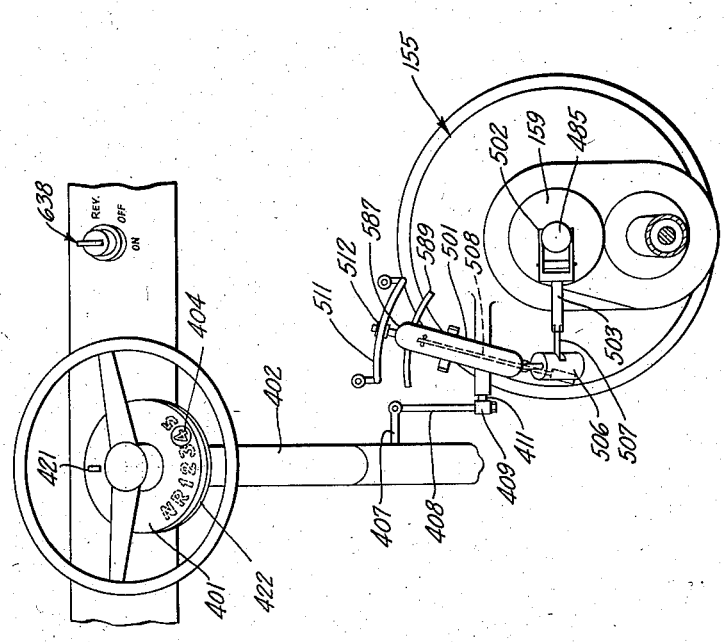
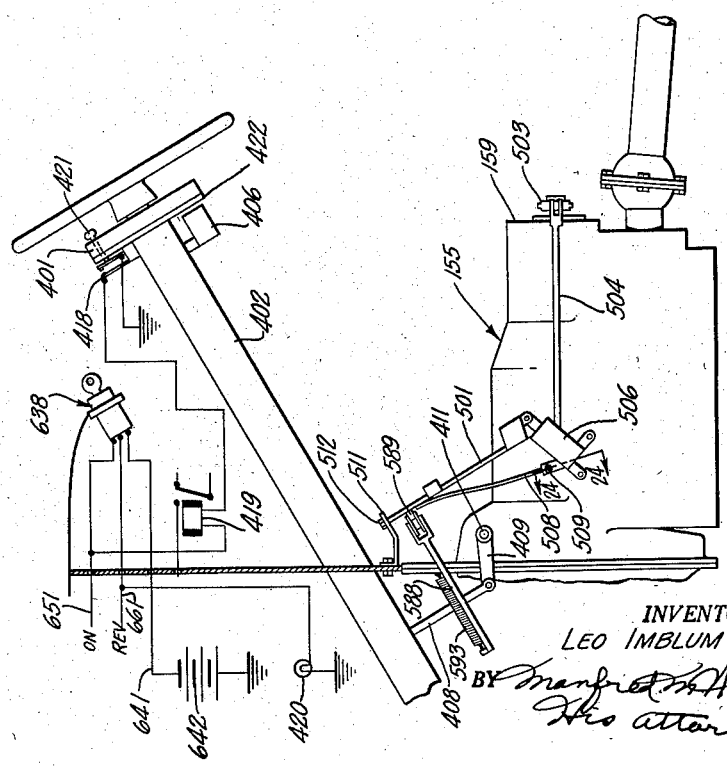
INVENTOR.
LEO IMBLUM Feb. 24, 1959　　　　　L. IMBLUM　　　　　2,874,586
AUTOMATIC TRANSMISSION
Filed April 11, 1955　　　　　　　　　　　15 Sheets-Sheet 2
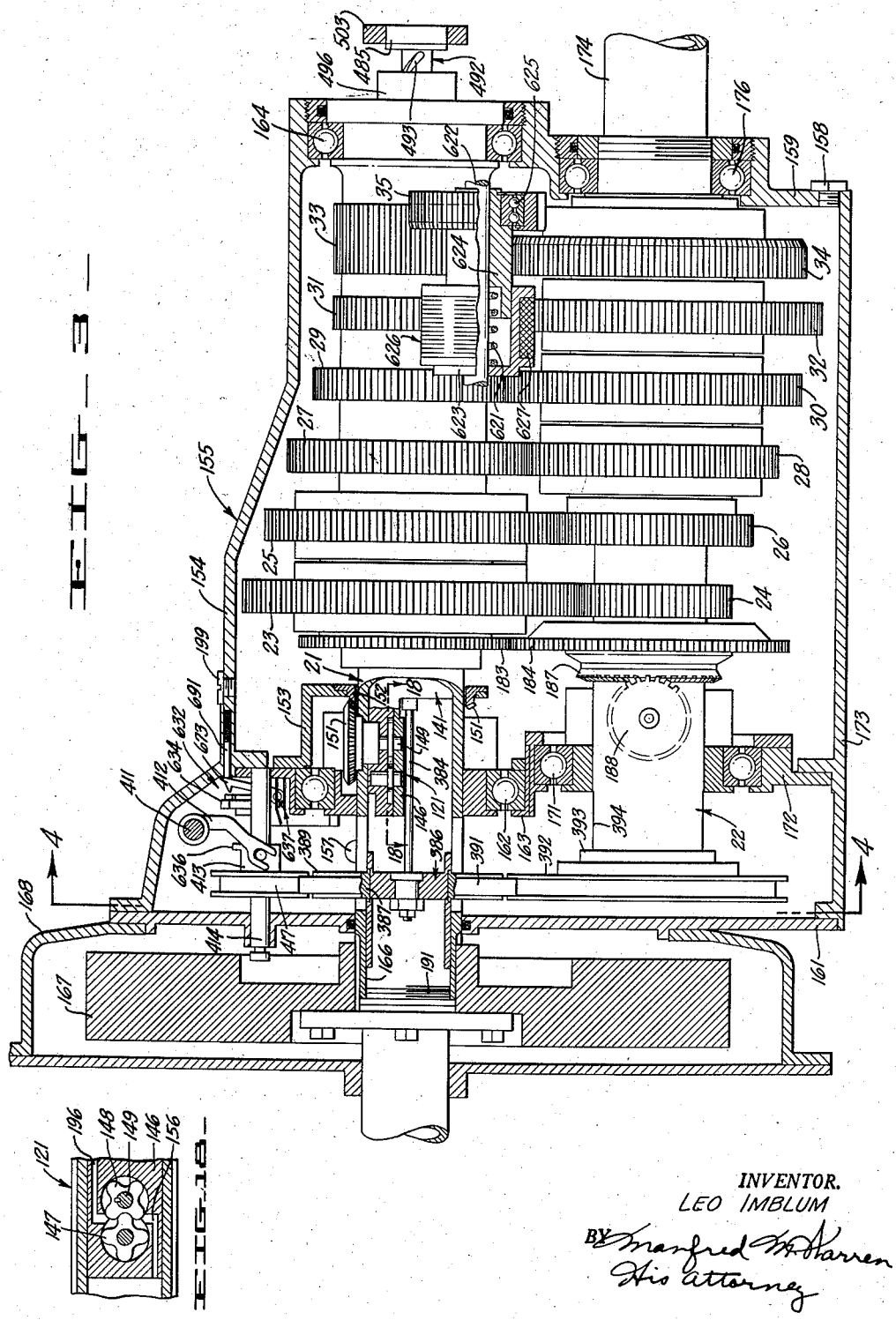
INVENTOR.
LEO IMBLUM
BY Manfred M. Warren
His Attorney

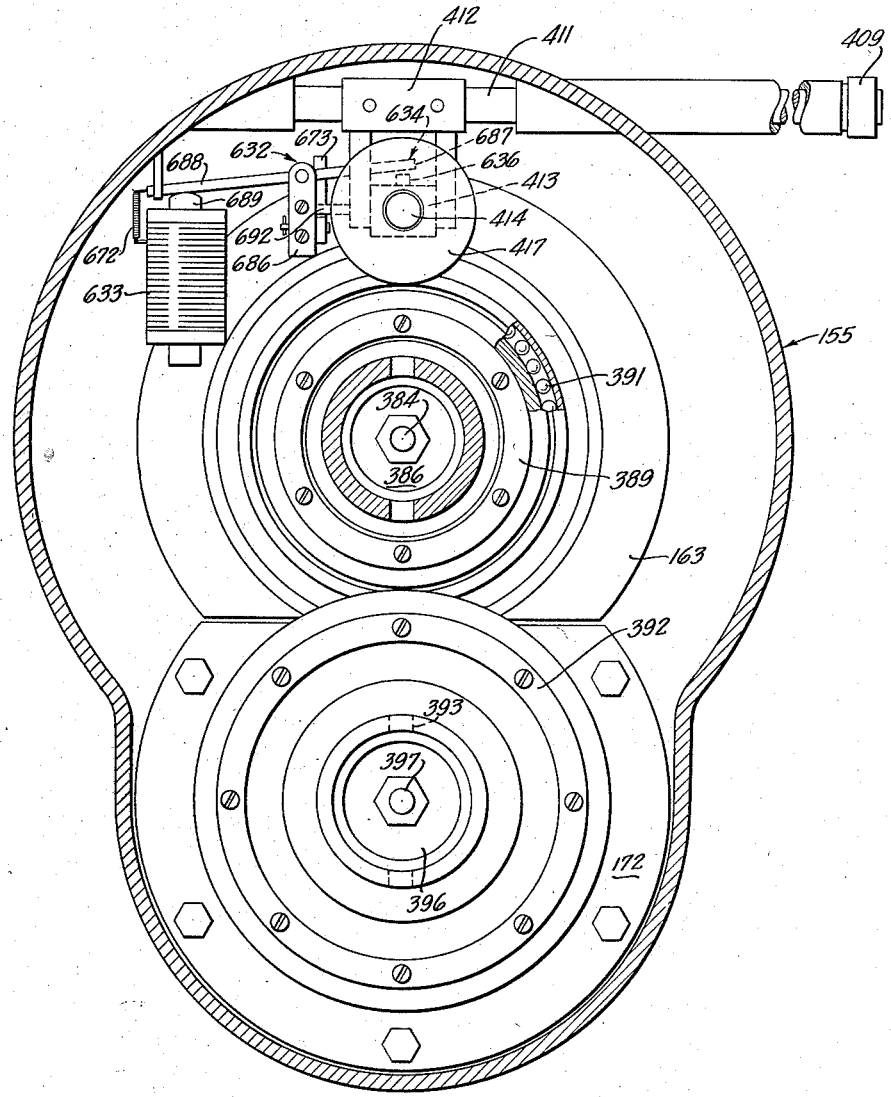

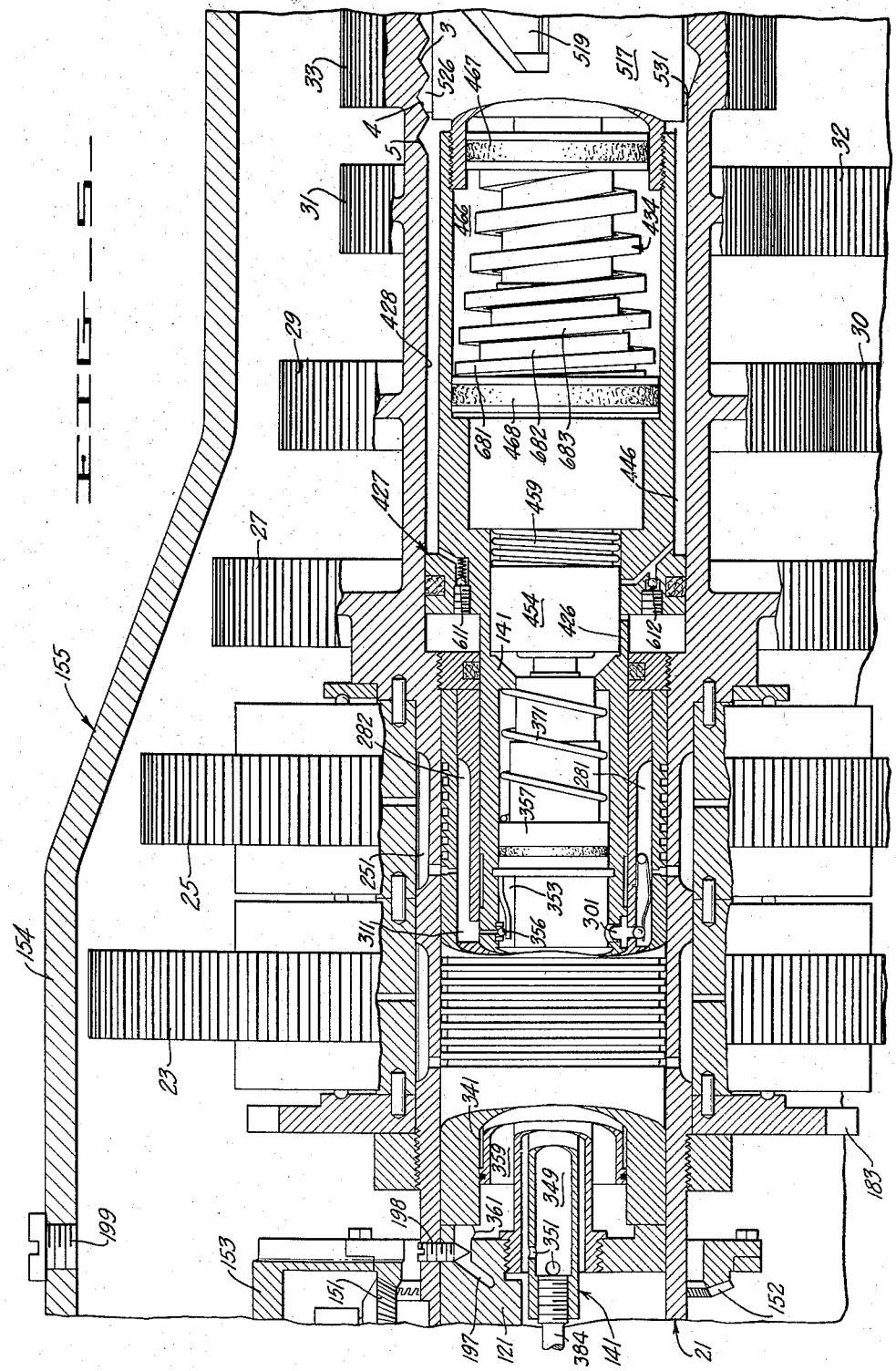

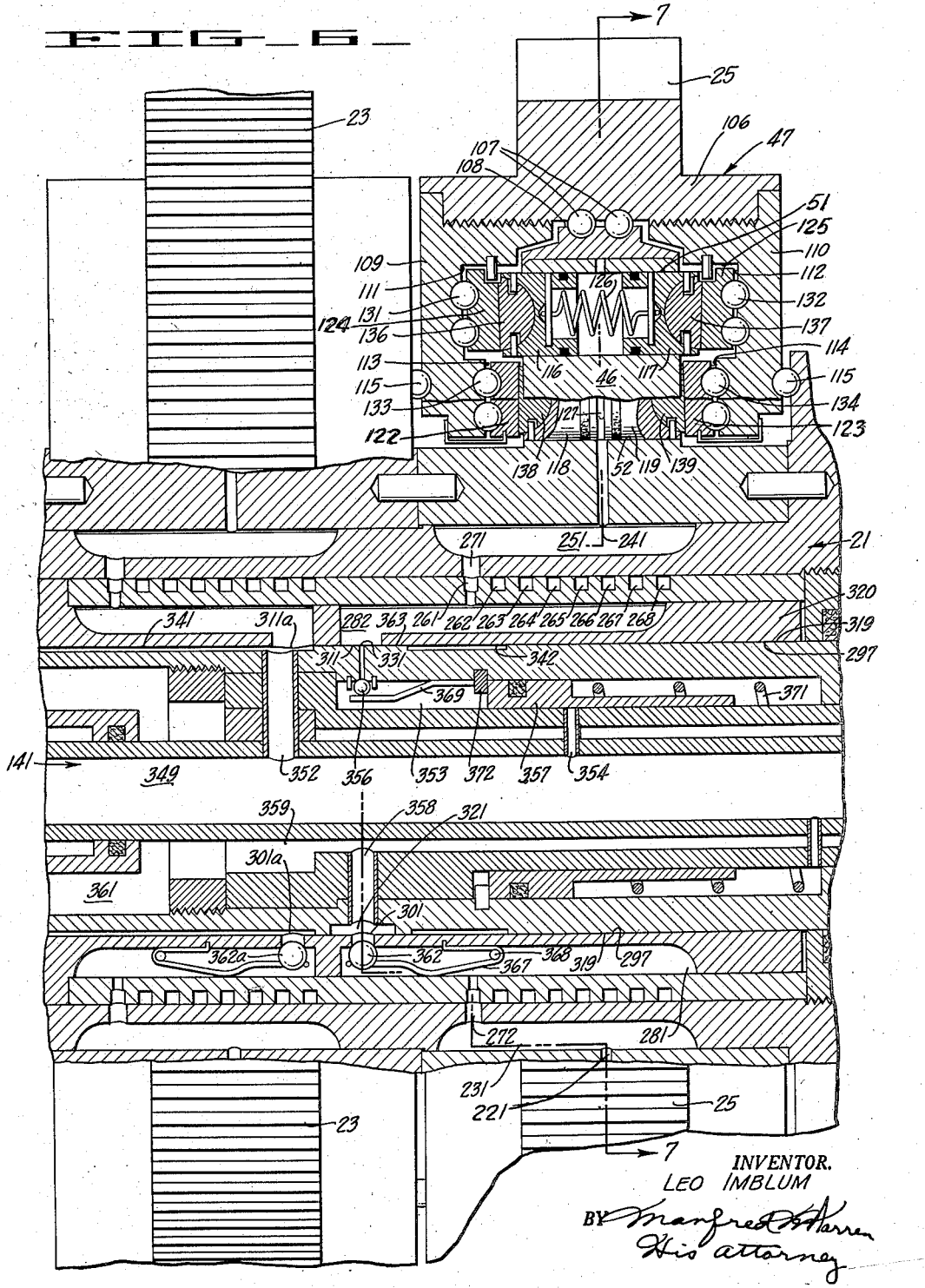

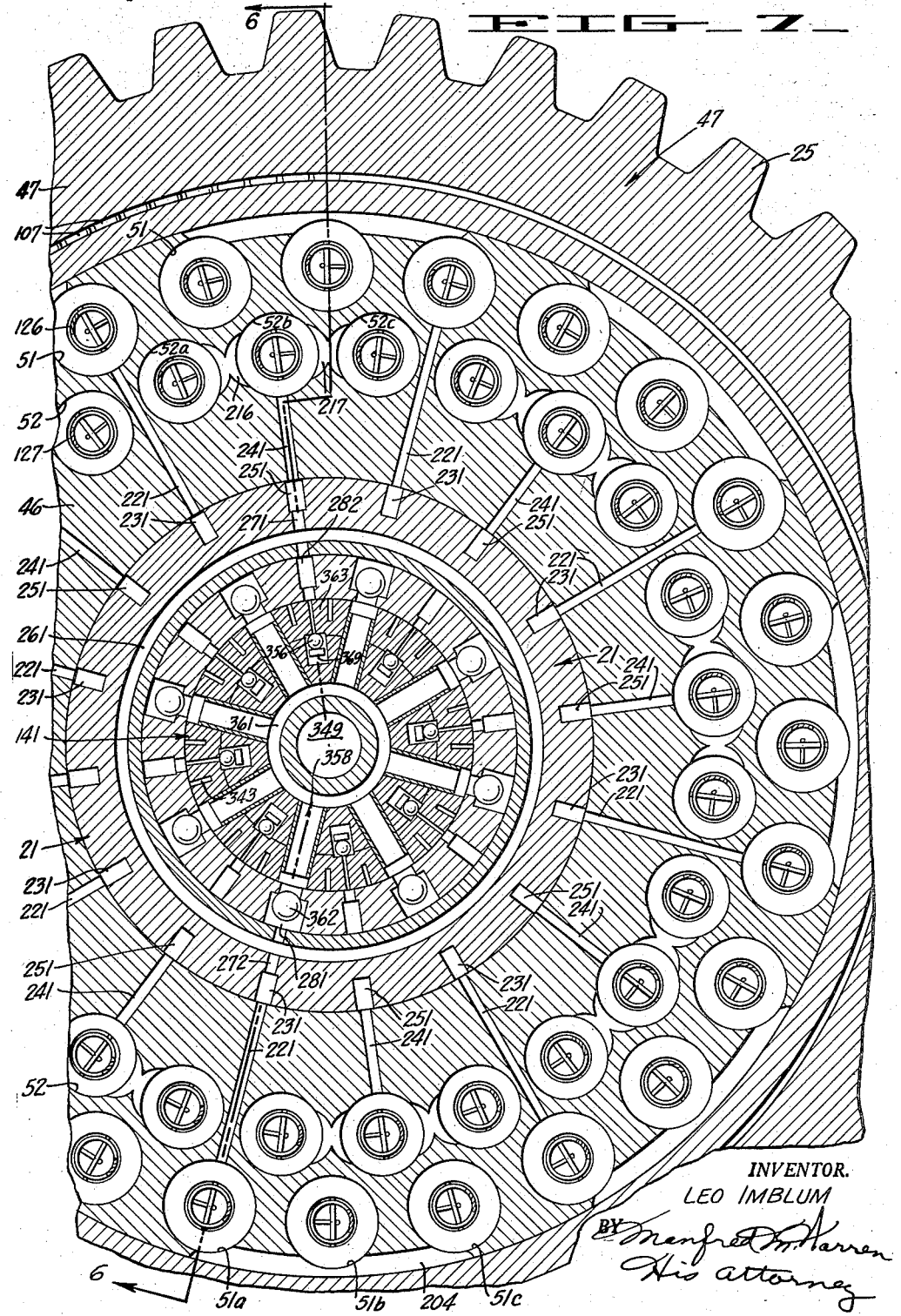

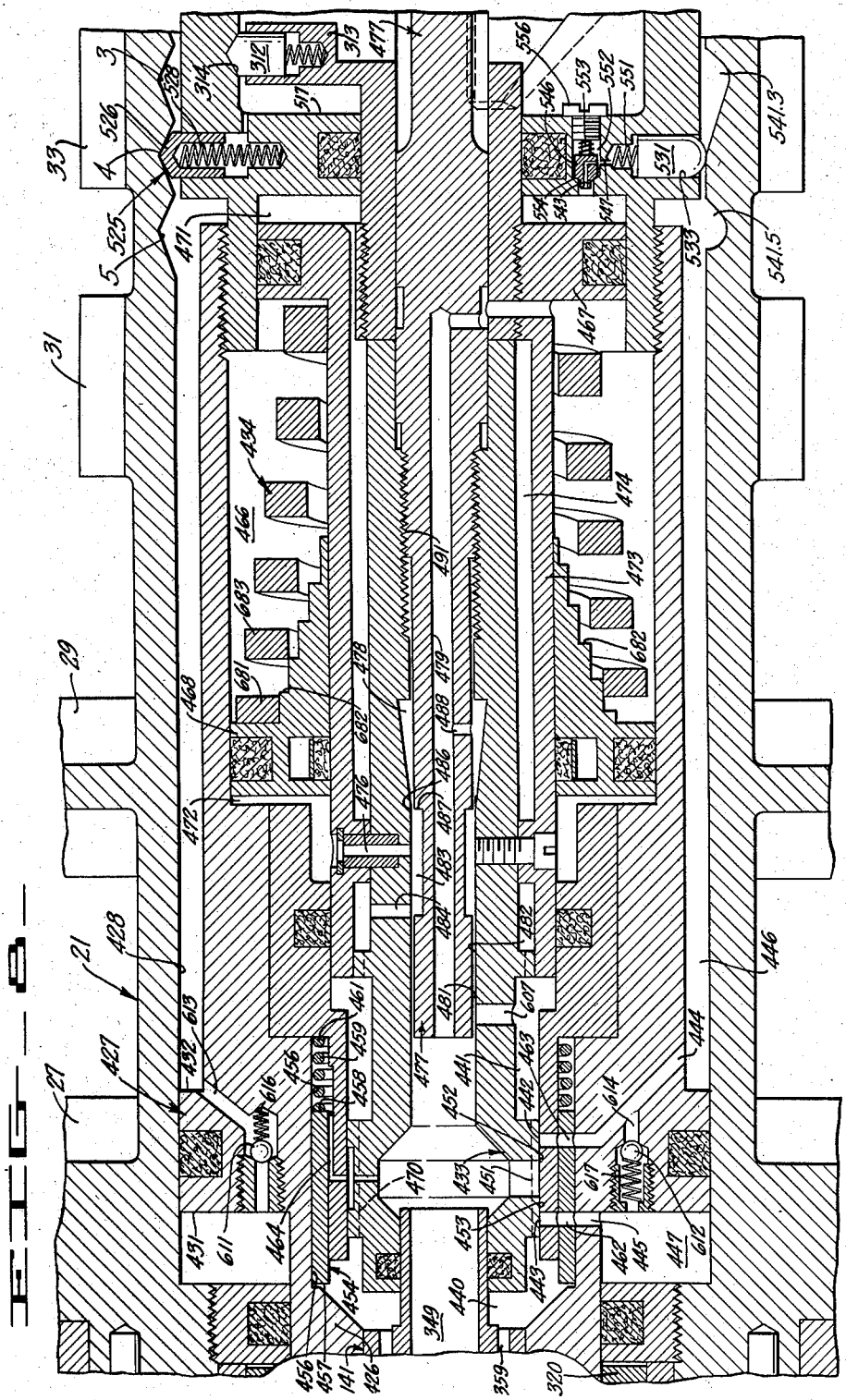

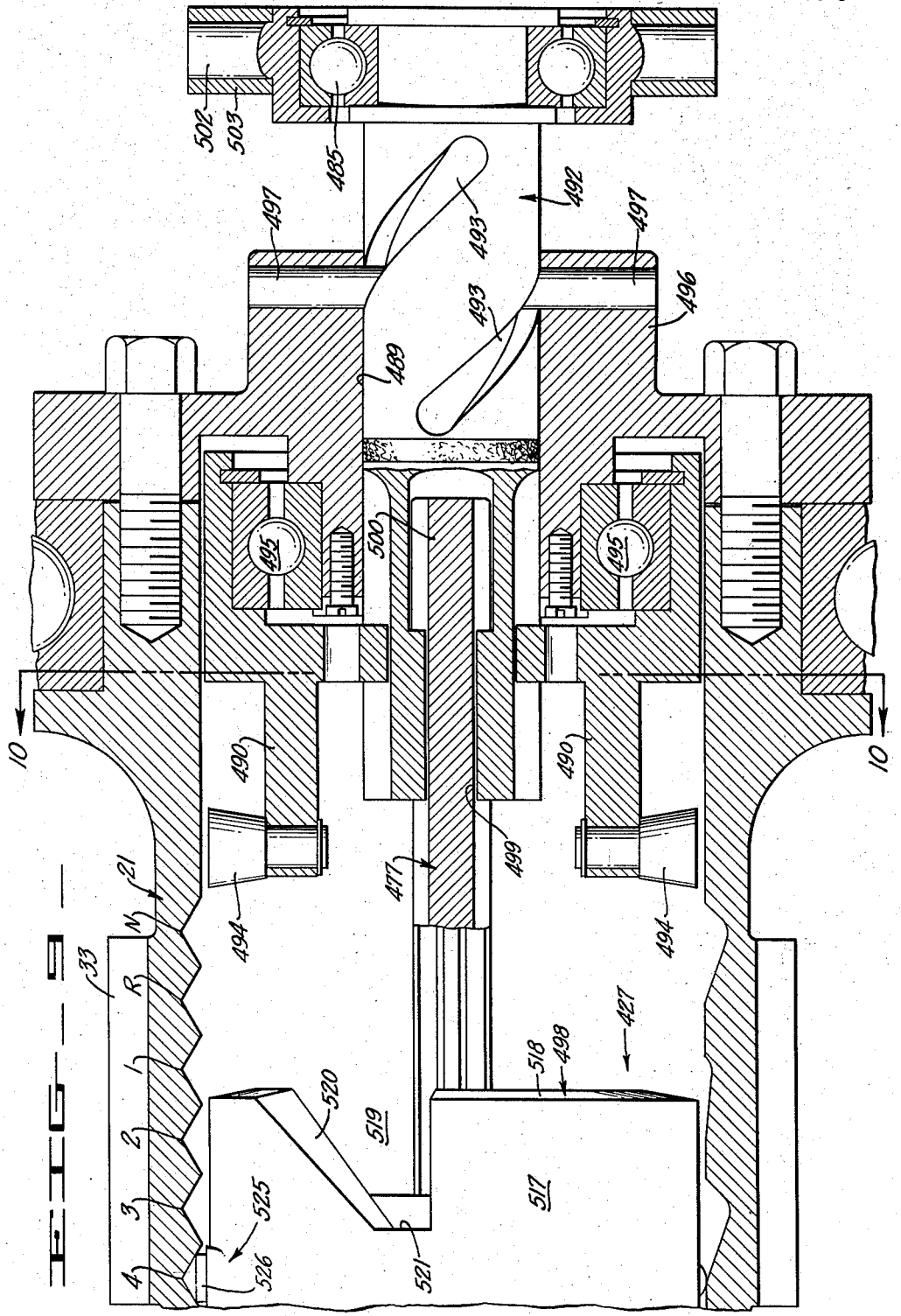

Feb. 24, 1959          L. IMBLUM          2,874,586
AUTOMATIC TRANSMISSION
Filed April 11, 1955          15 Sheets-Sheet 9
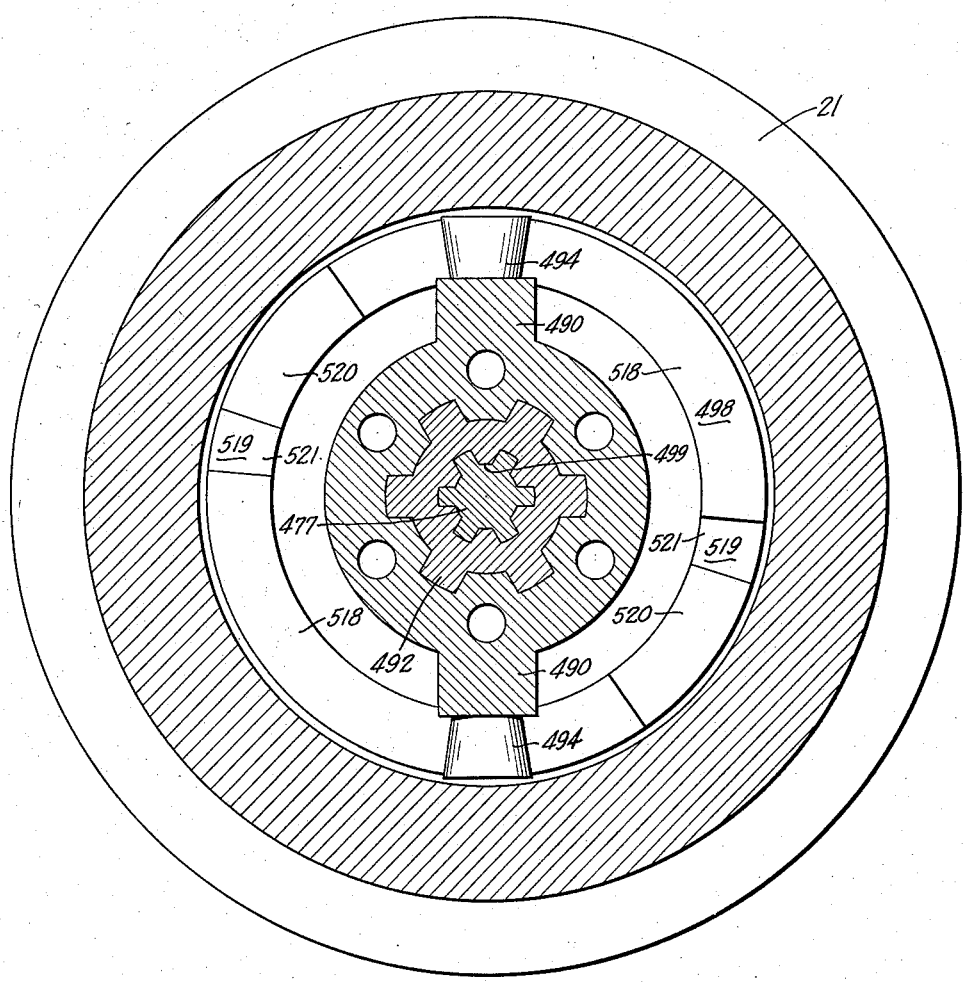
FIG_10_
INVENTOR.
LEO IMBLUM
BY Manfred M. Warren
His Attorney Feb. 24, 1959 L. IMBLUM 2,874,586
AUTOMATIC TRANSMISSION
Filed April 11, 1955 15 Sheets-Sheet 10

Feb. 24, 1959 L. IMBLUM 2,874,586
AUTOMATIC TRANSMISSION
Filed April 11, 1955 15 Sheets-Sheet 11
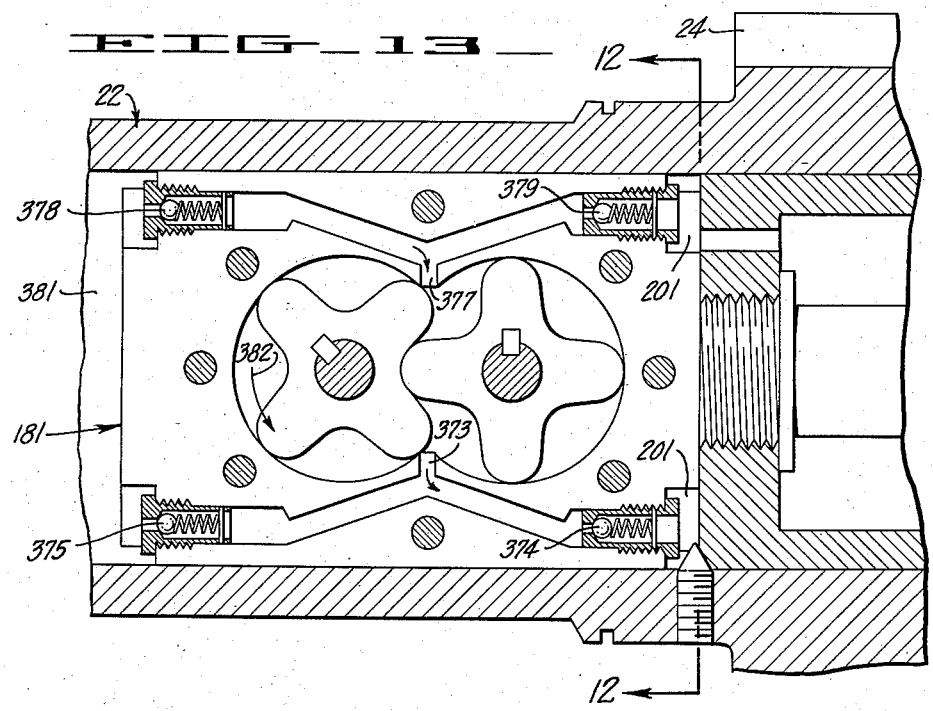
FIG_13
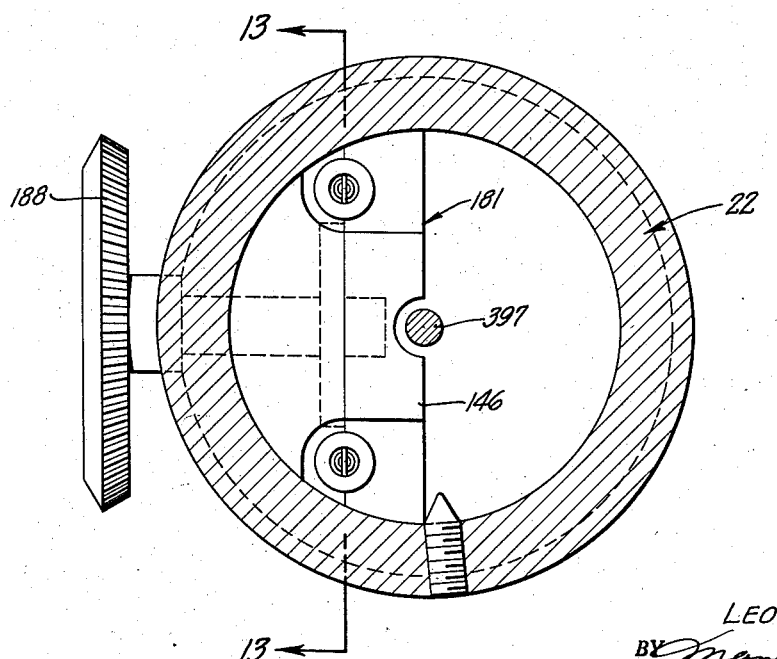
FIG_12
INVENTOR.
LEO IMBLUM Feb. 24, 1959 L. IMBLUM 2,874,586
AUTOMATIC TRANSMISSION
Filed April 11, 1955 15 Sheets-Sheet 12

INVENTOR.
LEO IMBLUM

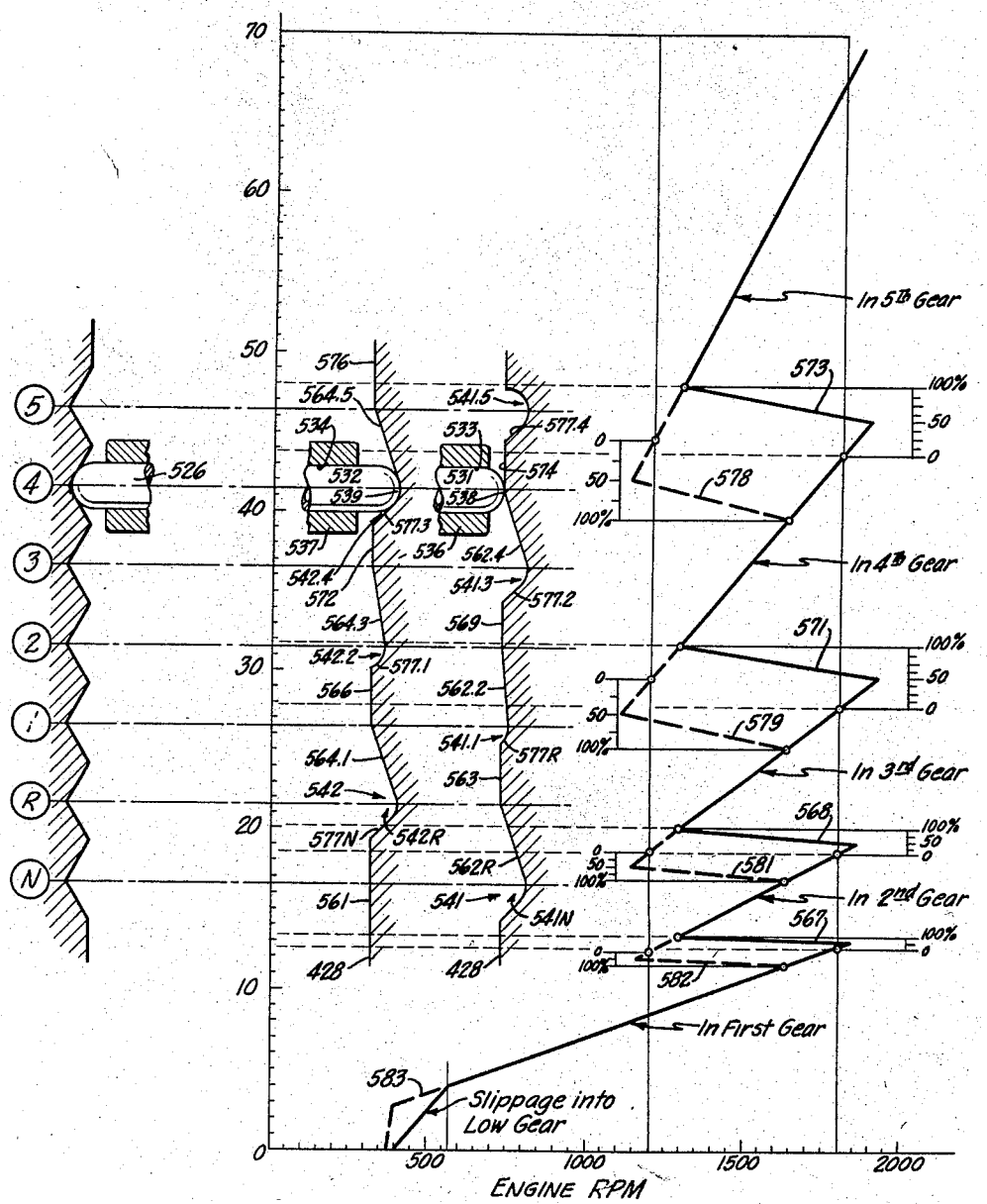

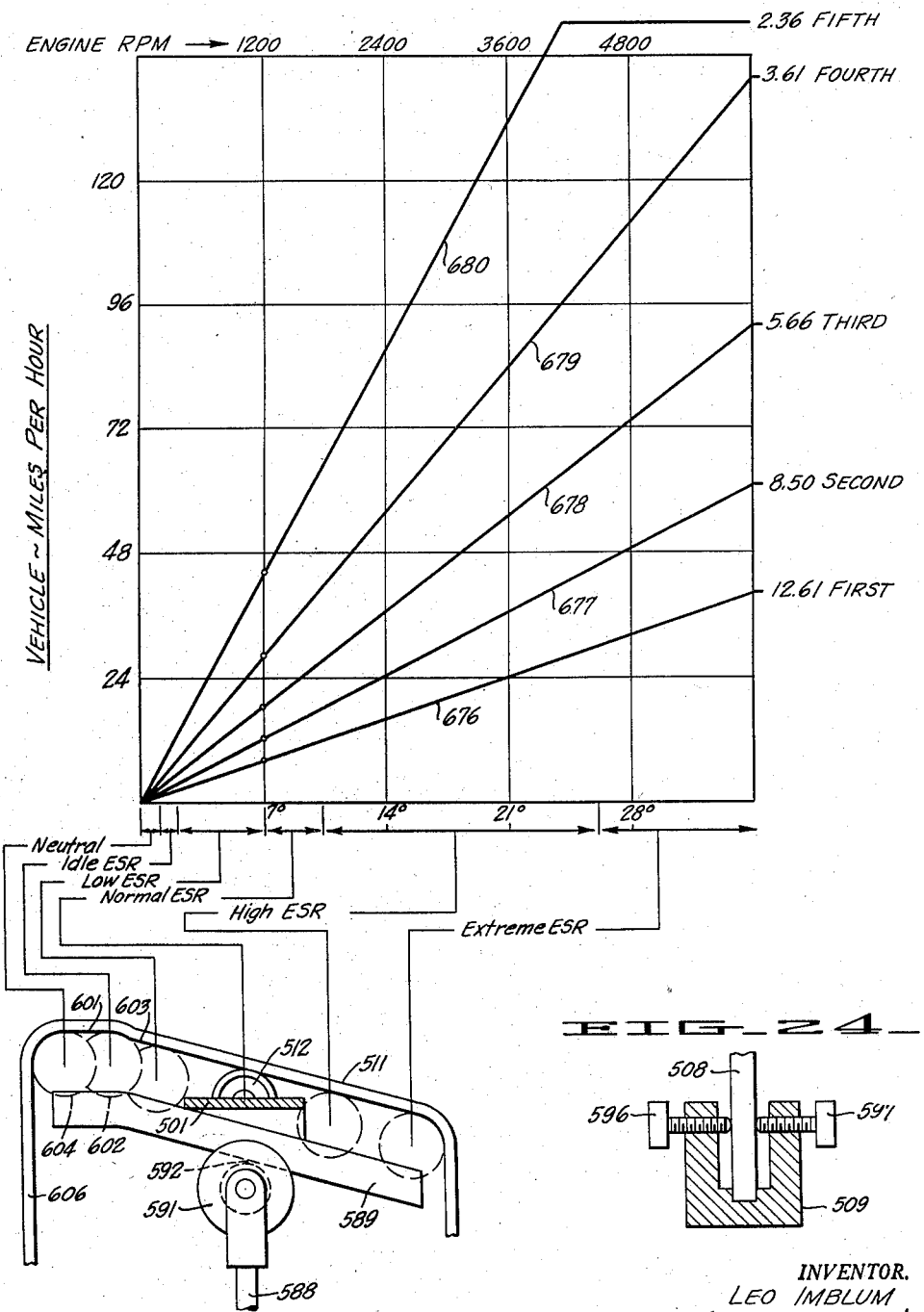

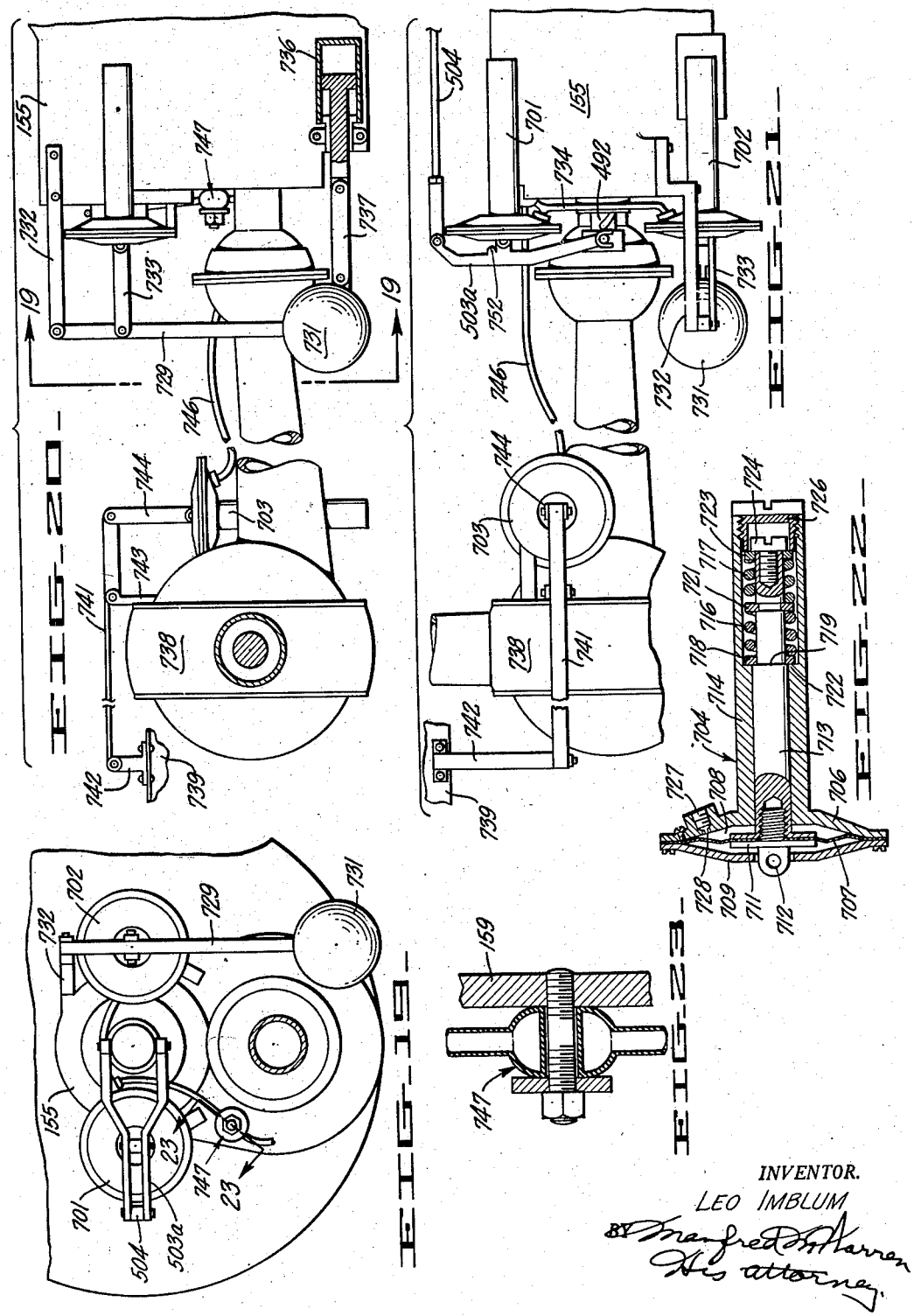

United States Patent Office 2,874,586
Patented Feb. 24, 1959

2,874,586

AUTOMATIC TRANSMISSION

Leo Imblum, Alameda, Calif.

Application April 11, 1955, Serial No. 500,332

40 Claims. (Cl. 74—472)

The invention relates to transmission mechanisms which provide by means of a plurality of gear sets and hydraulic coupling means a variable speed drive from an engine or other prime mover to a driven part, and which is responsive to engine speed to shift automatically between the several sets of gears.

An object of the present invention is to provide an automatic transmission of the character described wherein the plurality of gear sets and fluid coupling means cooperate in improved manner to afford smooth, quiet, positive and powerful shifting between the gear sets; and wherein the parts are designed and constructed and operate in a manner creating a balanced system of symmetrically applied forces affording, in a minimum and a usable size of unit, great strength, high power and torque transmission capacity coupled with extreme reliability and durability of the mechanism.

Another object of the present invention is to provide a transmission of the character above described in which the shifting operation may be effected either automatically, as a function of engine speed, or manually, and wherein the correlation between engine speed and automatic shifting is under continuous and instantaneous control to provide an engine shift range affording, as for example when applied to automotive use, a multiplicity of drive options such as an immediate gain in torque transmission where required, or a decrease in engine speed when permitted, and variable engine braking of vehicle speed when desired.

Still another object of the present invention is to provide a transmission of the character described wherein the aforementioned correlation between engine speed and automatic shifting may be manually controlled by movement of the accelerator pedal for the engine which controls the fuel flow to the engine in a separate or conjoint movement; and may be automatically controlled where desired in accordance with grade, load and temperature conditions.

Yet a further object of the present invention is to provide an automatic transmission of the character above having a high operating efficiency, and wherein fluid slippage and attendant loss of energy is confined entirely to the period of shifting between the several gear sets, and no fluid energy loss occurs during operation of the transmission in any of the gear sets.

Further objects of the present invention are to provide an automatic transmission mechanism of the character described: (1) incorporating a fluid pump built into the rotating system for elimination of seal problems and instantaneous replacement of leakage; (2) incorporating a reverse gear mechanism correlated in its function with the forward drive mechanism; (3) in which provision is made for coasting or towing and for starting of the engine by motion of the gear; (4) which will automatically provide a visual indication to the driver of the vehicle of the gear set engaged; and (5) wherein the speed of shifting between the gear sets is a function of the input shaft speed, whereby shifting from one gear set to another will be smooth at all operating speeds.

The invention possesses other objects and features of advantage, some of which, with the foregoing, will be set forth in the following description of the preferred form of the invention which is illustrated in the drawings accompanying and forming part of the specification. It is understood, however, that variations in the showing made by the said drawings and description may be adopted within the scope of the invention as set forth in the claims.

Referring to said drawings:

Figure 1 is a side elevation of an automatic transmission constructed in accordance with the present invention and shown in operative association with parts of an automotive vehicle.

Figure 2 is an end elevation of the transmission and associated parts illustrated in Figure 1.

Figure 3 is a longitudinal vertical sectional view of the transmission.

Figure 4 is a cross-sectional view taken substantially on the plane of line 4—4 of Figure 3.

Figure 5 is a fragmentary longitudinal sectional view of the upper portion of the transmission taken on an enlarged scale.

Figure 6 is a further enlarged fragmentary cross-sectional view of a portion of the transmission taken substantially on the plane of line 6—6 of Figure 7.

Figure 7 is a fragmentary cross-sectional view of the transmission taken substantially on the plane of line 7—7 of Figure 6.

Figure 8 is an enlarged longitudinal sectional view of a portion of the transmission adjacent the portion shown in Figure 6.

Figure 9 is an enlarged longitudinal sectional view of a portion of the transmission adjacent the portion shown in Figure 8.

Figure 10 is a cross sectional view of that part of the transmission illustrated in Figure 9 and is taken substantially on the plane of line 10—10 of Figure 9.

Figure 12 is a cross-sectional view of a part of the transmission shown in Figure 3 and is taken substantially on the plane of line 12—12 of Figure 13.

Figure 13 is a cross-sectional view of the fluid pump shown in Figure 12 and is taken substantially on the plane of line 13—13 of Figure 12.

Figure 16 is a diagrammatic representation and graph showing the homing and timing means and coordinated coupling and decoupling functions of the transmission.

Figure 17 is a diagrammatic representation and graph of the means and the graphical illustration of the transmission operation obtained thereby under the various manually selectable conditions.

Figure 18 is a fragmentary cross-sectional view of the pump shown in Figure 3 and is taken substantially on the plane of line 18—18 of Figure 3.

Figure 19 is a fragmentary rear elevational view of a modified form of the automatic transmission incorporating means for controlling the shift pattern of the transmission in accordance with the grade, load and temperature conditions.

Figure 20 is a fragmentary side elevation of the automatic transmission illustrated in Figure 19.

Figure 21 is a fragmentary plan view of the transmission illustrated in Figures 19 and 20.

Figure 22 is a fragmentary enlarged cross sectional view of one of the motor means used in the transmission illustrated in Figures 19–21.

Figure 23 is an enlarged fragmentary cross sectional view taken substantially on line 23—23 of Figure 19.

Figure 24 is a fragmentary cross sectional view taken substantially on the plane of line 24—24 of Figure 1.

Figure 11:
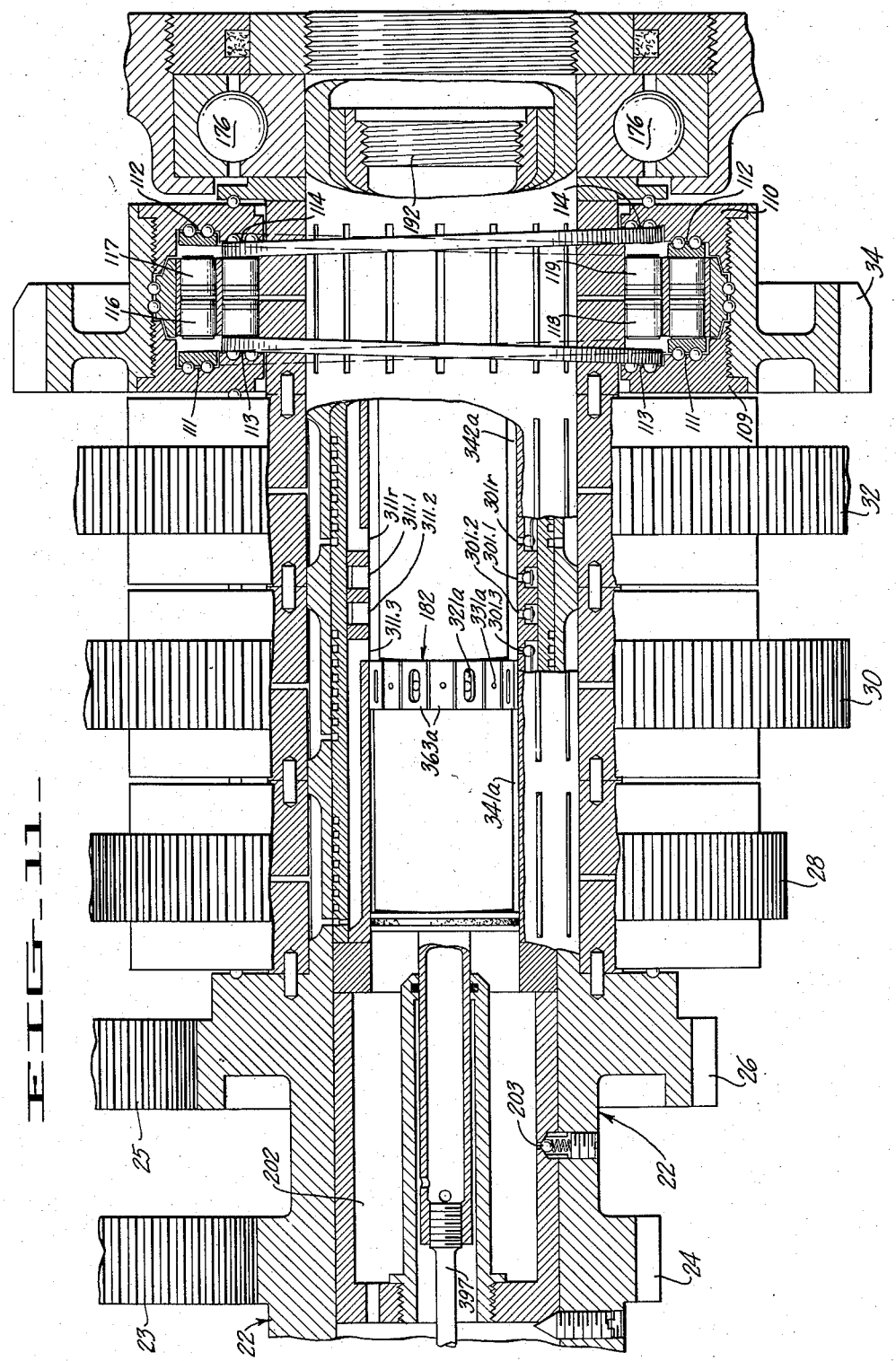
Figure 11 is a longitudinal sectional view of a lower portion of the transmission.

The automatic transmission of the present invention consists briefly of input and output shafts 21 and 22, which carry a plurality of constantly enmeshed gear sets 23 and 24, 25 and 26, 27 and 28, 29 and 30, and 31 and 32, here providing five forward speeds, and reverse gears 33 and 34, which are normally not engaged but which may be enmeshed with a reverse idling gear 35; a plurality of fluid couplings more fully hereinafter developed connecting each of the gear sets to the shafts; a hydraulic shifter valve which is arranged and constructed to control the operations of the several fluid couplings so that upon movement of the shifter valve in one direction the couplings will be energized and de-energized to selectively engage the gear sets in the order of increasing gear ratio, and upon movement in the opposite direction through such positions the gear sets will be engaged in the order of decreasing gear ratio; and means more fully hereinafter developed responding to the speed of the input shaft 21 to displace the shifter valve in its first mentioned direction as a function of decreased speed of the input shaft, and in an opposite direction as a function of increased speed of the input shaft.

Further important features of the present invention include manually operable means for taking over and superseding the automative operation of the transmission so that any of the several gears may be manually selected at will; means for manually controlling the correlation between the engine speed and automatic shifting and the coordinating of such means with the accelerator for the engine whereby the fuel flow to the engine and shift range of the transmission may be simultaneously controlled by conjoint movements of the accelerator pedal; the provision in the fluid couplings of a hydraulic control for coasting or towing of a vehicle equipped with the transmission as well as for starting the engine of the vehicle by the motion thereof; provision of a homing device connected to the shifter valve and functioning when the latter is between positions to urge the shifter valve to the nearest of such positions and to deter hunting of the mechanism, and which functions in coordination with means limiting the speed of the shifting operation between the gear sets as a function of the input shaft speed, whereby shifting from one gear set to another will be smooth and positive at all operating speeds; the provision of a remote indicator for showing the position of the shifter valve and the set of gears in operation; a control means for the reverse gear mechanism, which prevents automatic shifting into forward speeds while the reverse gear mechanism is in operation, and which additionally prevents shifting into reverse gear on automatic down shifting of the forward speeds; and various other features of advantage, which will be fully hereinafter set forth.

In accordance with the present invention, there is one gear in each of the sets of the constantly enmeshed gears which is journaled for free rotation on either the input or the output shafts, and the connection of this latter gear and shaft is under the control of a fluid coupling so that one fluid coupling is provided for each of the gear sets and controls the operation thereof. A typical showing of the fluid couplings of the present invention will be best seen in Figures 6 and 7, and a description of this unit will suffice for all of the units. As will be seen from these figures, the couplings consist briefly of concentrically arranged and relatively rotatable drive and driven members 46 and 47, the former being mounted upon and keyed to the input shaft 21 for rotation therewith, and the latter including gear 25 which is enmeshed with gear 26 carried for rotation on the output shaft 22. Accordingly, it will be understood that so long as member 47 is freely rotatable on member 46, no drive connection between the input and output shafts will be effected by the enmeshed gears 25 and 26, but upon the restraining of members 46 and 47 for joint rotation, and to the extent that they are so restrained, the drive connection will be effected between shafts 21 and 22 through enmeshed gears 25 and 26. The member 46 is here of generally disk shape and is formed with concentric banks of circumferentially spaced axially extending open-ended cylinders 51 and 52, the cylinders 51 in the outer bank here being twenty-four in number of which seventeen are shown in Figure 7 where seven identically constructed cylinders in the outer bank are deleted to obtain an adequate scale drawing. The cylinders 52 in the inner bank are likewise twenty-four in number of which eighteen are shown in Figure 7 where six identically constructed cylinders in the inner bank are deleted in the interests of clarity of illustration. The outer gear carrying member 47 is preferably of channel shaped annular form having a circumferentially extending wall 106, which is journaled as by means of bearings 107 on the outer periphery 108 of the member 46 and is provided with inwardly projecting flange-like, axially spaced annular cam walls 109 and 110 having pairs of axially opposed cam faces 111 and 112, and 113 and 114 in juxtaposition to the opposite ends of the two banks of cylinders 51 and 52 respectively. In accordance with the present invention and as may best be seen in Figure 11, the cam faces 111—114 are inclined to the axis, and the faces of each of the pairs are out of phase so as to approach and recede from the cylinder ends upon relative rotation of the members. Mounted for reciprocation in each of the cylinders 51 and 52 are pairs of opposed pistons 116 and 117 (in the case of cylinders 51) and 118 and 119 (in the case of cylinders 52), the pistons, in their extended positions, being engaged with and displaced by ring shaped bearing races 122, 123, 124 and 125 forming part of ball thrust bearings 131, 132, 133 and 134 running on the cam faces 111—114.

A fluid pump 121 shown in Figures 3 and 18 is operatively connected to the cylinders and functions to supply fluid under pressure therein between the pistons 116—119, to cause movement of the pistons against the cam faces 111—114 to apply coupling torque between the members 46 and 47; and as a feature of the present construction, the undulations of the pairs of cam faces 111—114 for the different banks are circumferentially staggered so that the coupling torque will be applied uniformly at circumferentially spaced positions around the axis of members 46 and 47. The fluid used in the couplings is an incompressible liquid such as petroleum oil so that upon filling of the cylinders 51 and 52 with fluid, and upon locking of the fluid therein, the pistons will be locked in their outwardly extending position against the cam faces 111—114, and a solid geared connection is effected between the input and output shafts 21 and 22 through gears 25 and 26. Preferably the cams 109, 110 are constructed as separate, annular plates secured as by threading at their outer periphery to wall 106, thereby permitting some resilient flexing of their cam surfaces in an axial direction. Such flexing is limited by bearings 115 here located between the several axially spaced units. Preferably ball bearings are used generally throughout and at positions requiring high speeds. I prefer to interpose nylon or other non-metallic balls between the metal balls so as to eliminate sparking and erosion of the balls by reason of high speed metal to metal frictional contact. As another important feature of the fluid coupling of the present invention spring means is provided for normally holding the pistons 116—119 in retracted position away from the cam faces so that in the absence of fluid pressure in the cylinders 51 and 52, the members 46 and 47 will be fully and completely decoupled and may move freely relatively to each other on the bearings 107. Such spring means here consists of a helical spring 126 mounted in tension between each of the pairs of pistons 116 and 117 in the outer bank of cylinders 51, and a helical spring 127 similarly mounted in tension between each pair of pistons 118 and 119 mounted in the inner bank of cylinders 52, the springs operating in each case to normally urge the pistons to inwardly retracted position free from engagement with the cam faces 111—114. During coupling and decoupling operation frictional losses are reduced by the provision of annular bearings 131, 132, 133 and 134 between each of the cam faces 111—114 and the head ends of pistons 116—119, the connection between the pistons and the bearings here being effected to permit necessary articulation by parts 136, 137, 138 and 139 having swivel connections in the head ends of pistons 116—119 and engaged with the bearing races as illustrated in Figures 6 and 11.

The operable connection of the pump 121 to the cylinders 51 and 52 and the release of fluid from the cylinders are under the control of a shifter valve 141. In accordance with the present invention and as a principal feature thereof, the drive shaft 21 is made of hollow tubular form, and the pump 121 and the shifter valve 141 are both mounted within the shaft so that the entire fluid systems are centrally contained within the shaft 21 and the surrounding cylinder block members 46 of the fluid coupling, whereby the making of fluid connections in the rotating system is greatly simplified, and seal problems substantially eliminated.

As will be seen from Figures 3 and 18, pump 121 consists of a pump housing 146 mounted internally of shaft 21 and for rotation therewith, and which contains enmeshed pump gears 147 and 148, the latter of which is driven by a shaft 149 projecting radially outwardly from shaft 21 for connection at its outer end with a drive gear 151 engageable with a stationary bevel gear 152 carried by a bracket 153 extending from the top wall 154 of the transmission housing 155. A fluid level is maintained in the housing 155 above the shaft 21 so that the pump housing 146 and its intake passage 156 is constantly immersed in the fluid. The fluid level is normally maintained to the height of a plug 157 in the case and may be drained from a plug 158 provided at the base of one of the end walls 159 of the housing. With further reference to the details of construction of transmission housing 155, it will be noted that the drive shaft 21 extends longitudinally between the opposite end walls 159 and 161 and is journaled for rotation in a front bearing 162 carried by a bearing cage 163 and at its opposite rear end in a bearing 164 integrally housed by the end wall 159. The forward end 166 of the drive shaft projects externally of end wall 161 for connection to the flywheel 167 of the engine. A bell housing 168 secured to the forward end wall 161 serves to attach the transmission case to the engine. The driven or propulsion shaft 22 is mounted in parallel relation to drive shaft 21 and extends longitudinally between the forward end wall 161 and the rear end wall 159. It is journaled at its forward end in bearing 171 carried by bearing cage 172, which is in turn supported on the bottom wall 173 of the housing. The rear end 174 of the output shaft is journaled in a bearing 176 integrally housed in the end wall 159 and projects rearwardly from the wall 159 for connection to the drive shaft of the automotive vehicle or other part or piece of equipment to be driven.

The main drive shaft 21 carries the driving gears 23, 25, 27, 29 and 31 consituting the drive gears for the five forward speeds provided by the present transmission and also carries gear 33 used for reverse drive. As above noted, gears 23, 25, 27, 29 and 31 are in constant mesh with gears 24, 26, 28, 30 and 32 carried by the driven or propulsion shaft 22, and a fluid coupling unit is incorporated in one of the gears making up each set. Since a progressive decrease in gear diameter is desired along the length of shaft 21 while contrariwise a progressive increase in diameter of gears is provided along the length of the output shaft 22, it is convenient to place certain of the fluid drive units in the gears on both shafts, that is to incorporate the fluid drive in the largest diameter gears on these shafts. Thus, in accordance with the present construction a fluid coupling is incorporated in the hubs of gears 23 and 25 on the drive shaft 21, and in the hubs of gears 28, 30, 32 and 34 mounted on shaft 22. Consistent with this arrangement of the output shaft 22 is formed with a hollow tubular construction in the same manner as drive shaft 21, see Figures 3, 11, 12 and 13, and carries an internally housed gear pump 181 and shifter valve 182. Gear pump 181 is driven by a gear 183 carried by the drive shaft. As will be seen in Figure 3, gear 183 is enmeshed with gear 184 which is journaled for rotation on the shaft 22, and which carries with it for rotation a bevel gear 187, which is in constant mesh with the drive gear 188 for pump 181 in the same manner as the driving connection for pump 121. As will be understood from the foregoing, gear pump 121 carried by drive shaft 21 is in rotation as long as the engine of the vehicle is in operation and under such circumstances is driven by the stationary gear 152. Also, during operation of the engine and rotation of shaft 21, gear 183 carried thereby constantly drives gears 184 and 187 on the output shaft 22 and accordingly drives the pump gear 188 for supplying fluid under pressure to the shifter valve in the propulsion shaft. The gear ratios effecting pump operation are selected so as to insure rotation of the pump gear 188 and a supply of fluid pressure in the output shaft 22 under all operating conditions (speeds of rotation) of the output shaft when fluid pressure is required therein for operating any of the fluid couplings carried thereby. The ends of the hollow shafts 21 and 22 projecting from the end walls 161 and 159 of the housing are appropriately sealed by plugs 191 and 192.

The discharge port 196 of pump 121 is connected to a pump pressure fluid passage 197 in the shaft 21, see Figure 5, from whence the fluid is picked up by the shifter valve 141 and carried longitudinally internally of the main or drive shaft 21 to service the cylinders of the fluid couplings on the main shaft as well as for the automatic controls later to be described. As understood, the discharge pressure of pump 121 will vary as a function of the speed of the input shaft 21, and this function is utilized in several important ways in the present transmission. It is also desirable to be able to adjust the fluid pressure particularly to compensate for wear of the pump, and for this purpose a pressure control valve 198 is here provided in the shaft 21 and in pump pressure passage 197. Access to valve 198 for adjustment may be had through a closure plug 199 provided in the top wall 154 of the housing in the plane of rotation of the valve 198.

In a similar manner the discharge port 201 of the fluid pump 181 carried in the output shaft 22 is connected to a main pump pressure fluid distributing passage 202 extending longitudinally through the shaft 22 for supplying the fluid couplings carried by the propulsion shaft, see Figure 11. The output pressure of pump 181 also varies with the speed of the propulsion shaft 22, and preferably a pressure limiting valve 203 is carried by the propulsion shaft in the fluid passage 202.

The arrangement of the cylinders 51 and 52 of each of the fluid couplings together with their fluid connections is best seen in Figure 7 of the drawings. As will be noted the cylinders in the outer bank are connected in groups of three cylinders 51a, 51b and 51c for each group making eight groups in all spaced 45 degrees apart circumferentially around the cylinder block member 46. To accomplish this arrangement, a circumferentially extending passage 204 is provided for the cylinders 51a, 51b and 51c comprising each group to connect the cylinders of the group. In a similar manner, the cylinders in the inside bank are connected together in groups of three 52a, 52b and 52c, thus providing eight groups of cylinders spaced circumferentially apart by 45 degrees in the same manner as the groups of cylinders in the outer bank. As will be noted, passages 216 and 217 connect the cylinders 52a, 52b and 52c together as a group, and like passages are provided to connect the other seven groups of inside cylinders.

Each of the groups of cylinders is connected by an individual fluid circuit. Eight radially extending passages 221 connect the eight groups of cylinders in the outside bank to eight circumferentially spaced longitudinally extending passages 231 in the main shaft 21. In a similar manner the eight groups of cylinders in the inside bank are connected by eight radial passages 241 to eight circumferentially spaced longitudinally extending passages 251 in the drive shaft 21. As will be seen from Figure 7, the radial passages 241 for the inner bank of cylinders are spaced circumferentially between the radial passages 221 for the outer bank of cylinders. Preferably all of the longitudinally extending passages 231 and 251 are arranged in circumferentially spaced relation equally distant from the center of the shaft and positioned with the longitudinal passages 231 servicing the outside bank of cylinders spaced circumferentially between the longitudinal passages 251 servicing the inside bank of cylinders.

In accordance with the present invention, each pair of opposed cam faces 111—112 and 113—114 provide one undulation or cycle for each revolution; for example with reference to Figures 6 and 11 it will be seen that the opposed cam faces 111—112 are at their widest point at the top of the views so that the opposed pistons 116 and 117 will be forced together upon relative displacement of the members 46 and 47 through 180 degrees of rotation from the position illustrated in the figures, and such pistons will complete one cycle of reciprocation reaching their outmost and innermost positions during one complete revolution of relative movement between members 46 and 47. In a similar manner, opposed cam faces 113—114 are illustrated at their narrowest position at the top of the views and at their widest apart position at the bottom of the views, thus placing these cam faces substantially 180 degrees out of phase with cam faces 111—112. In this fashion, diametrically equal forces are created around the axis of the fluid coupling unit so that the stresses are distributed. This circumferential distribution of forces around the axis of the unit coupled with the axially opposed forces of the pistons themselves enable the construction of a compact, strong and balanced unit of relatively very high torque and power transmitting capabilities.

Cooperating with the diametrical out of phase relation of the two pairs of cam faces, the fluid circuit is arranged to connect the diametrically opposed groups of cylinders in the inner and outer banks for joint operation. Thus cylinders 51a, 51b and 51c of the outside bank are connected to diametrically opposed cylinders 52a, 52b and 52c of the inside bank and the pistons in these two groups of cylinders will simultaneously apply their torque generating gripping actions. It is desirable that only the diametrically opposed groups of inner and outer cylinders be connected together so as to avoid a pumping action of fluid between the cylinders. To accomplish this connection of diametrical groups, while isolating them from each of the other connected groups, there is provided at the inner side of the longitudinal passages 231 and 251 a series of eight axially spaced annular fluid collecting rings 261–268, one in number for each of the cylinder groups. Each of the eight longitudinal passages 251 (for the inner cylinders) is connected to one of the collector rings 261–268 by a radial passage 271 and each of the eight longitudinal passages 231 (for the outer cylinders) is connected to the same collector rings 261–268 by radial passages 272 thereby placing the diametrically opposed pairs of groups of cylinders in the inner and outer banks in common fluid connection. For example with reference to Figure 7, it will be seen that cylinders 51a, 51b and 51c in the outer bank of cylinders at the bottom of the view are jointly connected by circumferential passage 204, by radial passage 221, longitudinal extending passage 231, radial passage 272 to collector ring 261. At the opposite (upper) side of the cylinder block, the opposed group 52a, 52b and 52c of inner cylinders are jointly connected by passages 216 and 217, radial passage 241, longitudinal passage 251, radial passage 271 to collector ring 261 thereby placing the upper group of cylinders 52a, 52b and 52c in common fluid connection with the lower group of outside cylinders 51a, 51b and 51c. In an identical manner each remaining group of diametrically opposed cylinders is connected to one of the collector rings 262–268.

In the case of the main drive shaft 21 here two fluid coupling units are provided in the hubs of gears 23 and 25; it is desirable that the fluid passages for the hydraulic cylinders for both of the couplings be brought longitudinally through the shaft to a common valving station so that the charging and discharging of these cylinders to control the operation of the fluid coupling units may be conveniently effected by relatively short strokes of a common selector or shifter valve 141. To do this and to provide for individual intake and discharge passages for each of the eight connected groups of cylinders, the eight collector rings 261–268 are connected to sixteen inwardly positioned and circumferentially spaced longitudinally extending passages (a pair 281 and 282 for each collector ring, see Figures 6 and 7), which are in turn connected to the interior peripheral wall 297 of the drive shaft 21 in a series of eight inlet ports 301 and eight discharge ports 311 which open to the wall in a common transverse plane. The fluid collector rings for the other fluid coupling on the shaft are similarly brought to a series of sixteen circumferentially spaced inlet and discharge ports located in a common transverse plane axially adjacent to the transverse plane of the ports 301 and 311, as shown at 301a and 311a.

The shifter valve 141 is here of cylindrical form having an external periphery 319 slidably mounted for reciprocation on the internal wall 297 of a sleeve 320 carried internally by the shaft, and the valve is provided in a common transverse plane with sixteen circumferentially spaced ports comprising eight pump pressure ports 321 which are spaced for registration with the inlet ports 301, and eight reservoir connected ports 331 positioned for registration with the shaft discharge ports 311 for receiving fluid from the cylinders for return to the reservoir (here represented by the transmission housing) under special circumstances later described. Normally, the evacuation of the cylinders is effected by a pair of axially spaced, annular reservoir connected valve ports 341 and 342 which are interconnected by passages 343 (see Figure 7) and are arranged for registration with the discharge ports 311 in axially displaced positions of the shifter valve. As here shown, the shifter valve is provided with a central hollow core 349, which opens by way of a port 351, see Figure 5, to the hollow interior of the shaft 21 from whence fluid may pass into the housing and to the suction side of pump 121. The reservoir passage 349 is connected to the valve ports 341 and 342 by a radial passage 352, see Figure 6. The secondary valve reservoir ports 331 are connected to the main reservoir passage 349 by way of a longitudinally extending valve chamber 353 provided in the shifter valve and connected adjacent one end to port 331 and medially of its length by radial passage 354 to the center core passage 349. In normal operation, ports 331 are closed by a spring loaded check valve 356 in the chamber 353 and passage 354 is closed by a spring loaded slide valve 357 also in the chamber 353. Connection of the pump pressure valve ports 321 is effected by a series of radial passages 358 which extend from the ports inwardly to a longitudinally extending annular pump pressure fluid passage 359, which extends longitudinally of the shifter valve and is connected by port 361 at the end of the shifter valve to the pump pressure passage 197 in the drive shaft, see Figure 5. Fluid under pressure is thus supplied by pump 121 to the pump pressure passage 359 in the shifter valve and through the eight radial passages 358 to the pump pressure ports 321 and thence outwardly through the aligned ports 301 in the shaft and the registering passages 281 leading to the cylinders.

As an important feature of the present construction a unidirectional valve means is provided in the last mentioned intake passages so that fluid will flow only in an outward direction in these passages to the cylinders and return flow from the cylinders will be checked. For this purpose a ball check valve 362 is provided in the eight intake passages 281 for the cylinders. In this manner fluid supplied under pressure to the cylinders will urge apart the pistons therein into coupling relation with the cam faces, and release of the fluid, to permit retraction of the pistons, is solely and exclusively under the control of discharge passages 282 and their ports 311.

With reference to Figure 6, the shifter valve is in position placing its pump pressure ports 321 in registration with the shaft inlet ports 301 whereby fluid under pressure is passed to the cylinders of the fluid coupling contained in gear 25. At the same time, a land 363 on the slide valve between reservoir ports 341—342 covers the cylinder discharge ports 311 with the exception that the valve ports 331 formed in the land are in registration but are closed by valves 356 and 357. In this condition the pistons in the cylinders are forced outwardly into full coupling engagement with the cam faces 111—114, and joint rotation of the gear 25 and the drive shaft is effected. At the same time, valve reservoir port 341 is connected to the discharge ports 311a of the adjacent fluid coupling for gear 23. Pistons in this fluid coupling are accordingly retracted by their springs 126 and 127 away from the cam faces whereby gear 23 is journaled for free rotation on the drive shaft. As the shifter valve is moved to the left, from the position illustrated in Figure 6, valve land 363 starts to close off the discharge ports 311a; and upon further movement pump pressure valve ports 321 start into registration with the inlet shaft ports 301a for the fluid coupling for gear 23. Fluid pressure thus opens the check valve 362a for the second fluid coupling and starts the fluid flow into the cylinders for urging apart the pistons therein. While the second coupling is taking hold, these pistons reciprocate in their cylinders as relative rotation between the coupling members takes place, the discharge of the cylinder fluid being permitted by the restricted but still open discharge ports 311a. As the shifter valve is moved further to the left, the discharge ports 311a are gradually closed off so as to lock the pistons against reciprocation and thereby fully couple the members. In all of the latter positions, the supply of fluid under pressure is maintained to the cylinders so as to constantly replenish any leakage which takes place and return movement of the fluid through the pump pressure passage is stopped by check valve 362a.

During the course of progressive energizing of the second fluid coupling, as above described, the first fluid coupling is progressively de-energized so that a smooth transition takes place from one to the other. As will be observed from Figure 5, the shifter valve on moving to the left progressively moves land 363 away from ports 311 while progressively bringing reservoir port 342 into registration therewith; and at the same time first maintaining connection of the pump pressure ports 321 and the shaft inlet ports 301 and thereafter closing off ports 321 so as to thereby slowly and progressively release increasing quantities of fluid from the cylinders of the first fluid coupling and effect gradual decoupling thereof.

As will be understood the transmission of torque between the coupled members accomplished by the closing off of the discharge ports 311 generates hydraulic pressure within the circuits of the fluid coupling, which is retained by check valves 362 and pressure control valves 356 and 357 thereby locking the pistons against the cam faces. Since the cam faces are flat over 360 degrees, four of the circuits will operate in compression while their pistons are being driven inwardly by the converging cam faces. The other four circuits operate on their fluid charging strokes wherein fluid is applied through the check valves 362. Pistons operating inwardly along the slopes of the cams remain under compression until the end of the converging slopes at which point the pistons are forced outwardly against the diverging cam slopes and under such circumstances change from pressure producing to pressure receiving status, which continues until the pistons reach the ends of the divergent cam slopes, at which point they again enter the compression convergent phase of the operation. After full closing of the cylinder discharge passages, the pistons will remain static for normal load conditions, except for leakage and the imposition of sudden high loads later described. The occurrence of leakage will only cause slow creeping action of the pistons as successive groups of pistons are slowly advanced over the convergent cam slopes providing at all times continuous torque transmission.

Since the check valves 362 are mounted in the shaft for radial movement, they are subject to opening action by centrifugal force. Accordingly, it is desirable to provide some means for counterbalancing these check valves so as to hold them closed at all shaft speeds. As here shown, leaf type springs 367 are used for urging valves 362 to their seats and weights 368 are mounted on cantilever arm portions of the springs for counterbalancing the valves 362.

As an important feature of the present transmission, the valves 356 and 357 provide means for controlling the release of fluid from the cylinders and thereby function to limit the torque applied. A sudden load thrown on to the fluid coupling, such as by rapid down shifting, compression braking of the vehicle, or the like will increase the fluid pressure in the circuits sufficient to force open valve 356, against the resistance of its closing spring 369, which renders the valve pressure responsive. An instantaneous high load will simply pop open valves 356 and squirt minute quantities of fluid into valve chamber 353, the valves 356 functioning to snap closed as soon as the instantaneous load passes. If the over load is sustained, valves 356 will remain open, more fluid will be discharged into valve chamber 353 and slide valve 357 will be moved against the resistance of its closure spring 371, until the valve uncovers passage 354 thereby venting valve chamber 353 to the reservoir passage 349. Upon passing of the over load, spring 369 will restore valve 357 in closing relation against passage 354, as illustrated in Figure 6, the valve 357 having a predetermined clearance to permit such return and being normally retained in returned position against a stop 372.

As above described, gear pump 181 is normally operated by the engine drive shaft 21 and, as will be understood, the gear type pump is inherently unidirectional in its operation. In accordance with the present invention means is provided for rendering pump 181 effective to energize the fluid couplings when for example if is desired to start a dead engine by pushing of the vehicle. In such case, gear 187, entrained to the engine shaft, is stationary, and rotation of the propulsion shaft 22 causes rotation of pump gear 188 in a normally reverse direction. Accordingly, in the present invention a multiway valve system is employed, see Figures 12 and 13, for obtaining a unidirectional flow of fluid to the fluid couplings, regardless of the direction of rotation of the gear 188. The normal discharge chamber 373 of the pump is provided with two check valves 374 and 375 arranged to transmit fluid away from the chamber 373 and for a reverse flow respectively. The normal suction chamber 377 for the pump is provided with two check valves 378 and 379 which permit flow into the chamber and a reverse flow respectively. Valves 374 and 379 are connected to pump discharge passage 201 and valves 375 and 378 are connected to pump intake passage 381. Accordingly, in the normal direction of rotation of the pump, as indicated by arrow 382, fluid is drawn into chamber 377 through check valve 378, and fluid is discharged from chamber 373 through valve 374. Upon rotation of the pump gears in reverse direction, fluid is drawn into chamber 373 through valve 375 and is discharged from chamber 377 through valve 379.

In accordance with the present transmission a common connection is effected between the shifter valve 141 mounted within the drive shaft 21 and the shifter valve 182 carried by the output shaft 22, so that these two valves move together longitudinally of their respective shafts through a plurality of positions successively engaging the fluid couplings mounted within gears 34, 32, 30, 28, 25 and 23. As will be best seen from Figures 3 and 4, the shifter valve 141 is connected by an axially extending rod 384 to a crosshead 386 slidably mounted for reciprocation within the shaft 21. The crosshead is provided with radially extending arms 387, which project through and are slidably carried by elongated slots provided in the shaft. The arms support a surrounding disk-like member 389, which has a channel shaped periphery and is connected by bearing 391 to a disk-like member 392 similarly carried by the output shaft 22. Member 392 is connected to shifter valve 182 by radial arms 393 carried in elongated slots 394 in the output shaft and secured to a similar crosshead 396 which is in turn secured by an axial rod 397 to shifter valve 182. In this manner joint axial movement of the shifter valves is effected by their common connection at bearing 391, while these valves and their supporting shafts 21 and 22 are permitted to rotate at different speeds and in different directions.

The foregoing movement of the shifter valves may be effected either manually or automatically. In accordance with the present invention the manual control also serves as a visual indicator and is displaced with the shifter valves when operated automatically so as to indicate the gear set engaged and may in turn be operated manually so as to over ride the operation of the automatic control where desired. The manual control here includes a hand wheel 401, which may be conveniently mounted on the steering column 402 of the automotive vehicle, see Figures 1 and 2, and is preferably provided with an indicating dial 404, which may, if desired, be colored for more rapid identification and be illuminated by a lamp 406. The hand wheel 401 is connected by an arm 407 and link 408 to crank arm 409 which is secured at one end of shaft 411 journaled in the case 155 for the transmission. Within the support of the case, see Figures 3 and 4, shaft 411 carries a crank 412 having bifurcated ends pivoted to a trunnion 413 carried on a slide shaft 414. The trunnion also journals a surrounding ring member 417, which is connected by bearing 391 to the periphery of the disk member 389. As will be observed the foregoing structure provides a common movement between the shifter valves and the hand wheel 401; and accordingly this hand wheel can be used to hand shift the transmission to any of the gear sets, or conversely, displacement of the shifter valves by the automatic means will cause a correlated rotation of the hand wheel, which in such case serves as a visual indicator. Also, and as an important feature of the present construction, the hand wheel 401 may be locked against rotation to thereby hold the transmission in any selected gears. This is accomplished by a manually controlled pin 421 carried by the hand wheel, which may be engaged in a series of sockets provided in stationary supporting member 422, the sockets corresponding in number to the number of shift positions of the transmission.

The shifting of the transmission through the successive gear changes occurs upon joint movement of the shifter valves 141 and 182 from their far right position, as viewed in Figures 5, 6 and 11, to their far left position and vice versa. The far right position corresponds to the neutral position of the transmission wherein the discharge passages of all of the cylinders of all of the fluid couplings will be connected to the reservoir, so that free relative rotation between the input and output shafts 21 and 22 may take place. As the valves move to the left, as viewed in Figures 5, 6 and 11, the annular reservoir ports 341a of shifter valve 182 move out of registration with and lands 363a move into blocking relation across the discharge ports 311r of the fluid coupling incorporated in the reverse gear 34, and as this occurs the pump pressure ports 321a of the valve are brought into registration with the shaft inlet ports 301r for the fluid coupling for the reverse gear. As will be seen from Figures 11 and 14, the inlet and discharge ports 301r and 311r are arranged in a common plane. Upon further movement to the left, as viewed in Figure 11, the valve reservoir passages move out of registration with and lands 363a move into blocking relation across the passages 311.1 of the fluid coupling incorporated in gear 32 representing the first or lowest forward gear, while the valve pump pressure ports 321a are brought into registration with the inlet ports 301.1 of the fluid coupling; and as this occurs annular reservoir port 342a of the valve moves into registration with the discharge passages 311r, so as to freely decouple the reverse fluid coupling upon energizing of the fluid coupling for the first gear. As valve 182 moves further to the left, it successively closes off the discharge ports 311.2 for the fluid coupling for the second forward speed gear 30 of the transmission, while registering the pump pressure port of the valve with the inlet port 301.2 of the coupling, thus energizing the fluid coupling for the second gear. At the same time, the annular reservoir port 342a moves into registration with discharge port 311.1 of the first gear, so as to decouple the first gear as the second gear is energized. In a similar manner, further movement of shifter valve 182 to the left progressively closes off discharge ports 311.3 for the third forward speed gear 28, while registering the pump pressure port 321a with the inlet ports 301.3 of this fluid coupling. As this occurs, the reservoir port 342a uncovers the discharge ports 311.2 of the second gear, so as to decouple this gear as the third gear is coupled.

During the above described four positions of shifter valve 182, annular reservoir ports 341 of shifter valve 141 has been in constant registration with the discharge ports 311.4 and 311.5 for the fluid couplings for the fourth and fifth forward gears 25 and 23 arranged on the drive shaft 21. As the shifter valves are moved further to the left the shifter valve 141 takes over and successively energizes and de-energizes these last two fluid couplings, so that the coupling action transfers in the latter two positions to the couplings on the drive shaft 21. Other than as above described the two shifter valves 141 and 182 are essentially the same, and the several fluid coupling units have their intake and discharge ports arranged for successive operation as above described. It will be noted that in each case, a gradual decoupling of one fluid coupling occurs simultaneously with a gradual coupling of the next fluid coupling, so that both are operative and thereby provide a smooth transition during the shifting operation. For example, upon shifting from neutral to first gear and then to second gear, the following passage connections are made:

| Successive Shift Positions and Range | Fluid Coupling Means, First Gear Set | | Fluid Coupling Means, Second Gear Set | |
|---|---|---|---|---|
| | Inlet Passage | Discharge Passage | Inlet Passage | Discharge Passage |
| Neutral | Disconnected from source | Open to reservoir | Disconnected from source | Open to reservoir. |
| Shift to First Gear | Graduated from position disconnected from source to position connected to source. | Graduated from position open to reservoir to closed position. | do | Do. |
| Shift from First Gear to Second Gear. | Graduated from position connected to source to position disconnected from source. | Graduated from closed position to open to reservoir. | Graduated from position disconnected from source to connected to source. | Graduated from open to reservoir to closed position. | whereby the fluid coupling means for said first gear set will be gradually coupled in the movement of said valve means from neutral through the shift to first gear and will be gradually decoupled during the shift from first gear to second gear while said fluid coupling means for said second gear set is simultaneously being gradually coupled.

Figure 14:
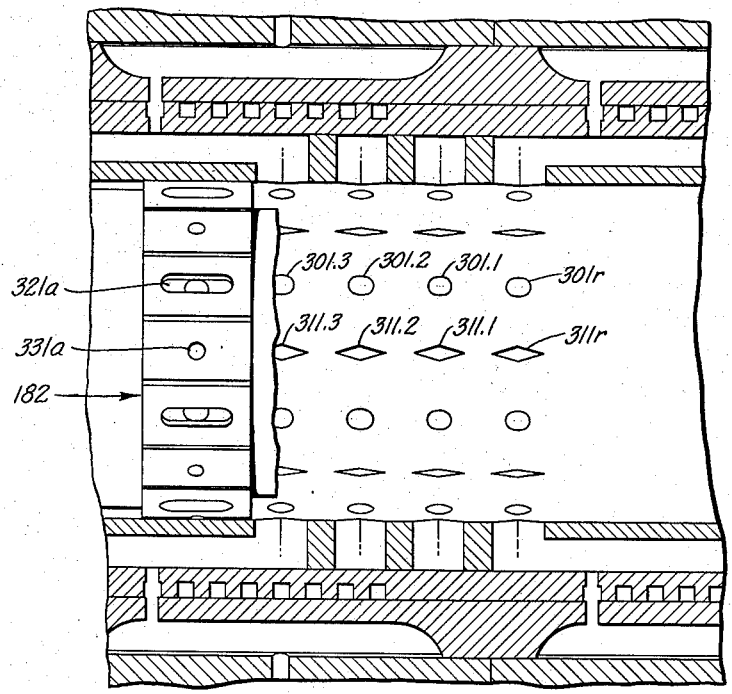
Figure 14 is an enlarged fragmentary cross-sectional view particularly showing the valve ports located in the lower, driven shaft of the transmission.

To further smooth out the transition from one fluid coupling to another, I prefer to construct the discharge ports 311 for the fluid couplings of diamond shape elongated axially of the shaft as illustrated in Figure 14, so that these ports are most gradually closed to coupling pressure and also most gradually opened to reservoir pressure.

Automatic shifting of the transmission is effected by a governor controlled hydraulic actuator connected to the shifter valves and being responsive to engine speed so as to cause a progressive up shifting of the transmission as the engine speed (and correspondingly the speed of the input shaft 21) is brought up to a predetermined amount. As will be seen in Figure 8, one end 426 of shifter valve 141 is connected to a piston 427 (functioning as a hydraulic actuator) which is mounted for reciprocation in an axially extending cylinder 428 in the drive shaft 21.

Displacement of piston 427 and correspondingly movement of shifter valve 141 is controlled as a function of the speed of rotation of the input shaft by placing the opposite head ends 431 and 432 of the piston under the control of a multiple position valve 433, which is in turn made responsive to the output pressure of fluid pump 121 and accordingly the speed of rotation of the input shaft. As a further and very important refinement of the control structure, the responsive action of valve 433 is biased by a spring 434 permitting the valve to open at a predetermined shaft speed so as to cause the shifting of the transmission, and means is incorporated for controlling the tension of the spring for changing the input shaft speed at which the actuator is energized.

As will be seen in Figure 8, the valve 433 is slidably mounted for longitudinal reciprocation in the hydraulic actuator 427 and is provided with pump pressure fluid passages 440 and 441, which are connected to the pump pressure fluid passage 359 of the shifter valve, the passages 440 and 441 being located at the periphery of the valve body so as to provide a sliding valve port movable into registration with ports 442 and 443 connected by passages 444 and 445 to the cylinder chambers 446 and 447 at the opposite head ends 432 and 431 of the actuator piston 427. The valve 433 is also formed with a reservoir port 451, located between ports 440 and 441 and which is connected to the main reservoir passage 349 extending through the shifter valve. Between the reservoir port 451 and the pump pressure ports 440 and 441 are spaced land portions 452 and 453 which have a longitudinal or axial dimension sufficient to simultaneously cover the ports 442 and 443 (see Figure 8). It will be noted that movement of the valve 433 to the left will cause pump pressure port 441 to move into registration with port 442, while the reservoir port 451 moves into registration with port 443, thereby connecting cylinder end 446 to pump fluid pressure while connecting the opposite cylinder end 447 to reservoir pressure and causing the actuator piston 427 to move to the left. A return movement to the right of the valve 433 restores the lands 452 and 453 across ports 442 and 443, thereby shutting off flow of fluid into and from the cylinder chambers 446 and 447, and accordingly locking the actuator piston 427 against movement. Further movement of the valve 433 to the right, positions reservoir port 451 in registration with port 442 and places pump pressure port 440 in registration with port 443, thereby communicating cylinder chamber 447 to pump fluid pressure and evacuating the opposite cylinder chamber 446 and accordingly causing movement of the actuator piston 427 to the right.

Since the fluid pressure in ports 440 and 441 increases at high shaft speeds, it is desirable to insert a fluid pressure limiting device between these ports and the actuator cylinder ends 446 and 447 so that a shifting of the transmission will not be too fast at high shaft speeds. For this purpose, I incorporate within the passages 444 and 445 leading to the cylinder ends a pressure responsive flow limiting valve 454. This valve here consists of an annular sleeve, which is mounted for axial reciprocation in an annular chamber 456 provided in the actuator passages 444 and 445. One end 457 of the sleeve 454 is exposed to pump pressure at port 440 while the opposite end 458 of the sleeve is engaged by a helical spring 459 compressed between such end and the adjacent end 461 of the chamber 456. Apertures 462 and 463 are formed in the sleeve 454 in position to register with ports 442 and 443 and passages 444 and 445. Spring chamber 456 is vented by passage 464 to the reservoir passage 349 to thereby permit reciprocation of the sleeve 454 in response to fluid pressure. As will be understood from the foregoing and with reference to Figure 8, movement of sleeve 454 to the right in response to increased pressure at port 440 will cause apertures 462 and 463 to move out of full registration and thereby restrict the fluid flow to the cylinders as a function of increased fluid pressure, and accordingly as a function of increased shaft speed.

Movement of the control valve 433, to in turn produce movement of the hydraulic actuator to effect shifting of the transmission at predetermined shaft speeds, is effected by another hydraulic actuator including a cylinder 466 formed internally of the piston 427, and a second piston 467 mounted for reciprocation in cylinder 466 and connected to the valve 433. Also forming part of the control and affording an important function in enabling manual adjustment of the shift range of the transmission is a third piston 468 also mounted for reciprocation in the cylinder 466. and which is connected to the piston 467 by means of the helical spring 434 above noted, and which is mounted in compression between these two pistons so as to urge the latter towards the opposite head ends 471 and 472 of the cylinder 466 and urging the control valve 433 towards its right hand position above described. The pump pressure fluid passage is continued through the body 473 of valve 433 by way of a longitudinal passage 474, which extends through the piston 467 to the head end 471 of cylinder 466. Accordingly piston 467 and the attached valve 433 will be displaced to the left, as viewed in Figure 8, against the resistance of spring 434 as a function of input shaft speed. Piston 468 has an exposed area at cylinder end 472 which is somewhat larger than the similar exposed area of piston 467 at cylinder end 471. The pump pressure passage 474 is also connected by passage 476 to cylinder end 472 and a valve 477 is provided in this passage for controlling the fluid pressure in cylinder end 472 and correspondingly the magnitude of the resilient action of spring 434 and the response of the movement of piston 467 to input shaft speed.

Valve 477 functions to control the pressure in cylinder end 472 by a shunt method by placing in parallel with passage 476 a parallel passage of variable size 478 to the reservoir passage 349. As will be seen from Figure 8, the valve 477 consists of a tubular part having an internal bore 479 connected at one end to the reservoir passage 349 and an exterior wall 481 slidably mounted for relative axial and rotatable displacement on the internal wall 482 of the valve body 473. Valve member 477 is provided with a peripheral groove port 483, which upon appropriate axial displacement registers a pump pressure fluid port 484 (formed through wall 482) with the passage 476. The parallel reservoir passage 478 is cut in the interior wall 482 as a conical enlargement having its reduced end 486 spaced axially from passage 476 for relative control by one end 487 of the peripheral channel port 483. Thus, with reference to Figure 8, it will be seen that movement of the valve 477 to the right will increase the by-pass flow of pump pressure fluid in passage 476 (and accordingly in cylinder end 472) to the variable passage 478, where more fluid is permitted to escape to reservoir passage 479, by way of a radial passage 488 in the valve member. Contrariwise, movement of valve 477 to the left will restrict such by-pass flow thereby applying increased fluid pressure in cylinder end 472, and accordingly increase spring force upon piston 467, as above described.

Reciprocation of valve 477 to provide the control described is here accomplished by a screw connection 491 of valve member 477 and valve body 473, a valve driver member 492, see Figure 9, having a spiral 493, a cam roller 494, a guide 496 and keys 497. The rollers 494 act on cam 498 to limit the stroke of the shifter unit. Spiral 493 converts linear motion applied to the driver member into turning motion of valve 477.

In accordance with the present invention, and as a principal feature thereof, driver member 492 is operatively connected to the accelerator pedal 501, which is mounted for movement in one plane (vertical) for controlling flow of fuel to the engine with which the transmission is used, and is mounted for separate and conjoint movement in a second plane (side to side) for operating valve 477 to control the shift pattern of the transmission. This is accomplished by connecting the foot pedal 501 (see Figures 1, 2 and 9) to driver member 492 exterior of the end wall 159 of the case, and such connection includes a setter trunnion bearing 485, setter trunnion 502, lever 503, tie rod 504, fulcrum 506, crank 507, foot pedal spring 508, spring adjustor 509, pattern guide 511 and guide bearing 512. With this structure side to side movement of the foot pedal, as seen in Figures 1 and 2, is translated into longitudinal reciprocation of valve 477.

The automatic operation of the governor is as follows. For a starting point, assume a medial side to side position of the foot pedal 501 in what may be considered a normal engine speed range. At idling engine speed, the fluid pressure in cylinder head end 471 will be low and accordingly piston 467 will be displaced fully to the right by spring 434. This displaces valves 433 to its right hand position, as illustrated in Figure 8, thereby communicating pump pressure port 440 with cylinder port 443 leading to cylinder end 447 and simultaneously connecting valve reservoir port 451 with cylinder port 442 leading to the opposite cylinder end 446, and accordingly causing displacement to the right of the hydraulic actuator 427 and its interior governor assembly carrying with it the shifter valves 141 and 182 so as to locate the latter in idle position. As the engine speed is increased, pressure in cylinder head end 471 increases thereby moving piston 467 and the connected multiple position valve 433 to the left, thereby placing pump pressure valve port 441 in registration with port 442 leading to cylinder end 446, and placing valve reservoir port 451 in registration with port 443 thereby releasing fluid pressure in cylinder end 447. Accordingly the hydraulic actuator 427 and the whole assembly, as illustrated in Figure 8, will move to the left to cause a shifting of the transmission into, say, its first forward speed. (For purposes of clarification, the parts as illustrated in the drawings correspond to the position of the hydraulic actuator in the fourth forward speed.)

When upshifting occurs the engine speed drops rapidly thereby decreasing fluid pressure in cylinder end 471 and permitting a return movement of piston 467 to the intermediate position of valve 433 positioning lands 452 and 453 across the ports 442 and 443, thus effectively locking the hydraulic actuator in the first forward speed of the transmission. In order to prevent hunting of the governor valve 433, a spring pressed detent 312 is carried by a boss 313 formed at the right hand end of valve 433, see Figure 8, in position for engagement with a socket 314 formed in a stationary interior wall portion of the actuator 427, the detent and socket being positioned for internesting engagement when the valve 433 is in its middle position with lands 452 and 453 covering ports 442 and 443 thus locking hydraulic actuator 427 in full gear engagement position. As the engine speed again picks up to its predetermined value, fluid pressure in cylinder end 471 increases to again effect leftward displacement of piston 467 against the resistance of spring 434, which again brings into registration valve port 441 and cylinder port 442, and reservoir valve port 451 and cylinder port 443, which in turn causes the hydraulic actuator to again step forward to the left causing a shifting of the transmission into the second forward speed. These foregoing operations are repeated at such time as the engine speed is brought up to predetermined amount for which shifting of the transmission is set, and the transmission thus successively shifts through the five forward speeds herein provided.

Downshifting is accomplished in a reverse manner. As the engine slows down, decreased pump pressure causes spring 434 to move valve 433 to the right as viewed in Figure 8, thus bringing into registration pump pressure port 440 of the valve and cylinder port 443, and valve reservoir port 451 and cylinder port 442. In this position, pump fluid pressure is fed into the cylinder end 447 while the opposite cylinder end 446 is connected to reservoir pressure, and accordingly the hydraulic actuator 427 and the governor mechanism carried thereby will move in its entirety to the right, as viewed in Figure 8 thus causing a downshifting from, say, fifth gear to fourth gear. Such a downshifting, occurring as for example when the engine is under load, will enable the engine to immediately pick up in speed, thus increasing the fluid pressure in cylinder end 471 and causing valve 433 to assume its intermediate position locking the hydraulic actuator in fourth gear. If, however, the increased torque afforded by the downshifting from fifth to fourth gear is insufficient to maintain engine speed at the load under which it is operating, valve 433 will remain at its rightward position leaving port 440 in registration with cylinder port 443 and accordingly causing the hydraulic actuator to continue to move to the right and to the next lower gear. In this manner, the governor functions to downshift the transmission until it provides a gear affording sufficient torque to maintain engine speed.

As an important feature of the present transmission, the side to side movement of the accelerator pedal is additionally utilized to prevent the shifter valve from entering the idle, neutral, and reverse positions at high engine speeds and particularly, as for example, when the engine is downshifting under load or being used for braking of the vehicle by engine compression. As will be seen from Figure 17, the accelerator pedal is moved fully to the left for neutral and reverse positions of the transmission and is moved to the right so as to put the transmission in what may be termed low engine speed range, normal engine speed range, high engine speed range and extremely high speed range, as denoted on the chart in Figure 17. The effect of swinging of the foot pedal to the right upon the reciprocation of control valve 477 has been hereinabove described. As will be seen from Figures 9 and 10, the rotary drive member 492 is provided with a pair of diametrically disposed cam rollers 494 on the side of the drive member, facing the adjacent end 517 of the hydraulic actuator 427, which contains the cam face 498 aligned with the rollers 494. In the two leftmost positions, viz. neutral and idle, of the foot pedal 501, the rollers 494 are oriented to engage an outstanding cam portion which limits the rightward movement of the hydraulic actuator to prevent its movement past low gear to reverse and neutral positions. Upon movement of the foot pedal to idle position, see Figure 17, the rollers 494 are oriented to engage an axially indented or relieved portion 519 of the cam 498, which permits the hydraulic actuator to move past its low gear position and into an idle position along the slope 520 of the indented portion 519 of the cam (this also being the reverse position of the actuator). Upon further leftward movement of the foot pedal to its neutral position, the rollers 494 are rotated to descend further along the slope 520 into portion 521 of the cam thereby permitting the hydraulic actuator to move fully to the right, as seen in Figure 9, and into its neutral position.

As will be understood, the valve actuating and cam and roller assembly above described are embodied in the rotating main shaft 21 and rotate as a unit with the shaft with the several parts being arranged to rotate relative to each other in order to obtain the various controls described. Accordingly the rotary drive member 492 (see Figure 9) is provided at its outer end with a bearing 485 which carries the trunnion 502 engaged with the yoke end of lever 503. Internally of the shaft 21 the drive member 492 is provided with a cylindrical periphery 489 which is carried for rotary and axial movement by the guide 496, here formed as an end closure piece for the shaft 21. The spiral 493 may consist of one or more spiral groove portions in the periphery 489, and the interfitting keys 497 here are provided by pins carried radially in the guide 496 and projecting into grooves 493. Desirably, the cam rollers 494 are maintained in a stationary transverse plane, and for this purpose they are here carried on a separate piece 490 which is splined to the exterior surface 489 of the drive member for axial displacement relative thereto but for joint rotation therewith, the piece 490 being journaled for rotation in a fixed transverse plane by bearing 495 carried by the guide member 496. As will also be noted, the drive member 492 is provided with an end bore 499 which receives in splined relation the outer end 500 of the valve stem 477.

In an automatic servo-type mechanism of the type herein described, there is a tendency for the mechanism to hunt. In accordance with the present construction, and as a principal feature thereof, a homing device 525 is connected to the shifter valve and functions when the valve is between position, as hereinabove described, to urge the valve to the nearest of such positions and to releasably hold the valve therein so as to effectively deter hunting of the mechanism. The homing device here consists of a spring pressed detent 526 mounted for radial reciprocation in a boss at the periphery of the body of the actuator 427 adjacent end 517 thereof, so as to engage the internal peripheral wall 428 of the drive shaft 21; and there is provided, in longitudinally spaced relation in the wall 428, a series of sockets labeled in Figures 8, 9 and 16 as N, R, 1, 2, 3, 4 and 5 and which correspond to the neutral, reverse and five forward speeds of the transmission. Normally, detent 526 is displaced radially outwardly into engagement in one of the sockets by a helical spring 528. As will be seen from Figure 8, the sockets are formed with substantially V shape walls, and the walls of adjacent sockets substantially meet in points intermediate the gear shift positions, so that the detent 526 engaging on one of the sloping walls of one of the sockets will displace the hydraulic actuator longitudinally into the gear shift position corresponding to a fully set position of the detent in the socket, and the spring 528 will releasably hold the actuator in such gear shift position, until a substantial speed change occurs.

As another important feature in the automatic operation of the present transmission, timing means is provided for limiting the rate of movement of the shifter valve between its various shift positions; and also of importance, the timing means is coordinated with the speed of the input shaft so as to decrease the rate of movement of the shifter valve between its shift positions at higher input shaft speeds. The timing means here consists of a pair of pistons 531 and 532, see Figure 16, which are carried in cylinders 533 and 534 provided in bosses 536 and 537 in the wall 517 of the hydraulic actuator, the pistons being thus mounted for radial reciprocation and to engage at their outer ends 538 and 539 in longitudinally spaced recesses 541 and 542 in the interior wall 428 of the drive shaft. The pistons and recesses thus provide relatively movable cam and follower parts and timing is accomplished by restricting fluid flow from the cylinders 533 and 534 so as to limit the rate of movement of the pistons therein and accordingly the rate of movement of the shifter valve as determined by the pitch and length of slope of the surfaces of recesses 541 and 542 engaged by the pistons. As will be seen in Figures 8 and 16, the cylinders 533 and 534 are connected to the source of fluid under pressure at cylinder end 471 by means of a restricted passage 543, a description of one of these pistons and cylinder combinations here sufficing to describe both. Accordingly inward movement of piston 531 expels fluid from the cylinder 533 through the restricted passage 543 and into the cylinder end 471 in direct opposition to the pump pressure. Two functions are thus accomplished. The size of restricted passage 543 serves as a timing means. Additionally increased pump pressure decreases the rate of movement of the piston at higher input shaft speeds. Also, since the pistons 531 and 532 are mounted for radial reciprocation and are carried for rotation with the input shaft, centrifugal force acting upon pistons 531 and 532 resisting their inward displacement and likewise functions to automatically decrease the rate of movement of the shifter valve between shift positions at higher input shaft speeds. Accordingly, in the present transmission, the shifter valves are delayed in their movement between shift positions for a sufficient period to enable the slippage in the fluid couplings and the gradual transition of couplings from one to another to take place (as more fully above described) and to provide for a smooth shifting of one gear to another at all input shaft speeds.

The two sets of pistons 531 and 532 and sockets 541 and 542 operate alternately to control the longitudinal movement of the shifter mechanism, one piston recovering while the other piston is under compression. Rapid recovery, that is outward movement of the piston, is facilitated in the present construction by the provision of a check valve 546 mounted in passage 547 connecting each of the cylinders to the pressure chamber 471, and which functions to open to admit fluid readily and rapidly into the cylinders 533 and 534, when pistons 531 and 532 are permitted outward movement. The outward movement of the pistons is effected by the fluid pressure, by centrifugal force, and also by a spring 551, which may be mounted in compression between the pistons and the inner ends of the cylinders 533 and 534. As will be seen from Figure 8, the check valve 546 is mounted for reciprocation in a valve chamber 552 and is normally urged by spring 553 into a seated or chamber closing position, against seat 554 at the fluid inlet side of the chamber. Restricted passage 543 is provided in the body of the check valve 546. Accordingly fluid flow from cylinders 533 and 534 to chamber 471 is confined to the restricted passage 543. On the other hand, when a reverse fluid flow is permitted, such as recovery movement of pistons 531 and 532, the fluid pressure will push open check valve 546 and permit rapid fluid flow from cylinder end 471 into cylinders 533 and 534.

In the present mechanism the timing may be readily increased or decreased by changing of the check valve part 546 containing different sizes of restricted passages 543, and for this purpose a closure plug 556 is provided for the valve chamber 552 for permitting easy access thereto.

The operation of the timing mechanism in limiting the speed of the shifter valves between gears and its relation to engine speed is depicted in Figure 16. For the purposes of this representation and description which follows, the following conditions have been assumed:

For given size of passage 543 and distance of movement of shifter valve in shifting from one gear to the next, a timing delay of one second corresponding to the tangent of 10 degrees of incline or pitch of the walls of recesses 541 and 542.

A vehicle acceleration of 2 miles per hour per second.

The following gear ratios (overall engine to axial ratio) for the five forward speeds and for reverse:

| | |
|---|---|
| 1 | 12.61 to 1 |
| 2 | 8.50 to 1 |
| 3 | 5.66 to 1 |
| 4 | 3.61 to 1 |
| 5 | 2.36 to 1 |
| R | 11.08 to 1 |

Wheel diameter—29.30.

At the time of the starting of the engine, the shifter valve will be disposed all the way to the right, as viewed in Figures 8 and 9 (this position corresponding to the lowermost position of pistons 531 and 532 in Figure 16), thereby locating detent 526 in recess N, detent 531 in recess 541N, and detent 532 on land 561 contiguous to recess 542R. The shifting mechanism remains in the position noted during the idling range of the engine approximately 300 to 400 R. P. M. As engine speed increases from about 400 R. P. M. the pressure in cylinder end 471 increases to cause advancing of the shifting mechanism to idle reverse and then first gear position. In moving from neutral to reverse position, detent 531 is caused to traverse an inclined surface 562R of recess 541N. The length and pitch of surface 562R is such as to provide a timing relay of approximately 2 seconds. During this movement, detent 532 moves across land 561 and into recess 542R. If reverse gear 35 is not engaged, the shifter mechanism continues to move thereby displacing detent 531 over land 563 contiguous to surface 562R and requiring detent 532 to traverse inclined recess face 564.1. The length and pitch of face 564.1 is such as to provide a timing delay of approximately 2 seconds. The shift into first gear occurs while engine speed increases from approximately 400 to 560 R. P. M., as illustrated on that portion of the curve in Figure 16 delineated "Slippage into Low Gear" and vehicle speed increases to about 4 M. P. H. At approximately 560 R. P. M., the shifting mechanism will be installed in first gear. At such point detent 526 rests in recess 1, detent 531 rests in recess 541.1 contiguous to land 563, and detent 532 rests on land 566 contiguous to surface 564.1. The shifter mechanism remains so positioned during acceleration of the vehicle in low gear up to an engine speed of approximately 1,800 R. P. M., and a vehicle speed of approximately 12 M. P. H., as shown by that part of the graph shown in Figure 16 and delineated "In Low Gear."

At approximately 1,800 R. P. M. the pressure in cylinder end 471 builds up sufficiently to cause the hydraulic actuator to step ahead to move the shifter mechanism from first to second forward speed. In so doing, the fluid coupling contained in gear 32 is progressively decoupled as fluid coupling contained in gear 30 is progressively energized thus causing a smooth transition between first and second forward gear, as more fully hereinabove described. During this movement of the shifter mechanism, detent 526 moves from recess 1 to recess 2, detent 531 is caused to traverse the inclined surface 562.2, while detent 532 traverses land 566 and enters recess 542.2. The length and incline of surface 562.2 is such as to provide a timing delay of 0.46 second and the shift change takes place during an increase of vehicle speed from 12 to 13 M. P. H. corresponding to a vehicle acceleration of 2 M. P. H. per second. The shifting into second gear changes the gear ratio so as to impose a greater load and cause a deceleration of the engine to approximately 1,300 R. P. M., corresponding to a vehicle speed of 13 M. P. H. in second gear, as shown by that portion of the graph delineated by numeral 567. The shifter mechanism will remain in second gear until the engine speed again reaches approximately 1,800 R. P. M. and the vehicle speed 18.5 M. P. H. This portion of the graph is delineated "In Second Gear." At this point, the shifter mechanism moves to decouple the fluid coupling in second forward gear 30 and to couple fluid coupling in 3rd forward gear 28 as shown on the graph at numeral 568.

This movement of the shifter valve causes detent 526 to move from recess 2 to recess 3, detent 531 to ride over land 569 contiguous to surface 562.2 and into recess 541.3, and detent 532 to traverse inclined face 564.3 of recess 542.2. The latter face is of a length and pitch providing a timing delay of 0.78 second, which occurs with an increase of vehicle speed from 18.5 to 20 M. P. H., and again corresponding to a vehicle acceleration of 2 M. P. H. per second. With the shifter mechanism installed in 3rd gear, the engine speed will increase from 1,300 to 1,800 R. P. M., as delineated by that part of the graph "In Third Gear" and during an increase of vehicle speed from 20 to 27.8 M. P. H. At this point, assuming engine speed continues to increase, shifting will occur from 3rd to 4th gears successively decoupling fluid coupling in gear 28 and energizing coupling in gear 25. It will be noted that a change in position of the fluid coupling here takes place from the output shaft 22 to the input shaft 21 and is illustrated in that part of the graph delineated by numeral 571. During this movement of the shifter mechanism, detent 526 moves from recess 3 to recess 4, detent 531 is required to traverse inclined face 562.4, while detent 532 rides over land 572 contiguous to surface 564.3 and into recess 542.4. The length and incline of face 562.4 is such as to provide a timing delay of 1.84 seconds. This occurs during an increase of vehicle speed from 27.8 to 31.5 M. P. H. and represents a vehicle acceleration of about 2 M. P. H. per second.

During the shifting from 3rd to 4th gear, engine speed, see graph portion 571, decreases to about 1,300 R. P. M. corresponding to a vehicle speed of 31.5 M. P. H. in 4th gear. Ensuing vehicle acceleration in 4th gear is shown on the graph and occurs during a vehicle acceleration from 31.5 to 43.5 M. P. H. At this point, continued engine acceleration will cause shifting into 5th gear, as indicated by that portion of the graph 573. During this shift operation, detent 526 moves from recess 4 to recess 5, detent 531 moves across land 574 and into recess 541.5, and detent 532 is caused to traverse inclined face 564.5 of recess 542.4. The latter face has a length and pitch causing a timing delay of 2.25 seconds, which occurs during an increase of vehicle speed from 43.5 to 48 M. P. H., which represents the constant vehicle acceleration during shifting of 2 M. P. H. per second. During shifting into 5th gear, the engine again decelerates to approximately 1,300 R. P. M. representing a vehicle speed of 48 M. P. H. in 5th gear, and at this point hydraulic actuator 427 has moved all the way to the left, as viewed in Figure 8 and the transmission will remain in 5th gear during continued engine acceleration, as represented by that portion of the graph delineated "In Fifth Gear."

Automatic down shifting of the transmission with decreased engine speed is illustrated in the graph, Figure 16 in dash lines. The action in down shifting is essentially the reverse from the step by step up shifting process described in the foregoing in that the several detents and their recesses and sockets cooperate to provide a homing function in the case of detent 526 and its socket, and a time delaying function in the case of detents 531 and 532 and their recesses or sockets. With the transmission in 5th gear, a decrease in motor speed to approximately 1,200 R. P. M. and a corresponding decrease of vehicle speed to about 44 M. P. H. will cause a decrease in fluid pressure in cylinder end 471 to such an extent that the multiple position valve 433 will be displaced by spring 434 to cause the hydraulic actuator 427 to be moved to the right, as seen in Figure 8 to move the shifter valve from a position energizing the fluid coupling in gear 23 to a position in which this latter fluid coupling is de-energized, thereby shifting from 5th to 4th gear. In this movement detent 526 is moved from socket 5 to socket 4, see Figure 16. Simultaneously, detent 531 moves from recess 541.5 onto land 574 while detent 532 moves from land 576 into recess 542.4. In this movement, detent 531 is caused to traverse inclined face 577.4 of recess 541.5, which delays the down shifting action from 5th to 4th gear. The down shifting operation from 5th to 4th gear is shown in the graph, Figure 16, by that dash lined portion of the graph delineated by numeral 578. As will be noted, down shifting starts as the engine speed reaches about 1,200 R. P. M. and continues during engine acceleration up to about 1,650 R. P. M., when the transmission has shifted into 4th gear. Stated in another way, down shifting from 5th to 4th gear occurs during a period of time controlled by the passage of detent 531 over inclined face 577.4; and during this shifting period, the engine speed increases due to the gradual coupling of the lower gear as a result of down shifting. As will be seen from Figure 16, the relationship of the various parts provides a completion of the down shift at approximately 1,650 R. P. M. or well in advance of the 1,800 R. P. M. at which upshifting will occur.

Deceleration of the vehicle in 4th gear occurs along that portion of the graph so indicated until the engine speed is again reduced to about 1200 R. P. M. then down shifting occurs from 4th to 3rd gear, as indicated by that dash portion of the graph 579, and in a similar manner the successive downshift portions 581 and 582 are shown for the downshift from 3rd to 2nd gear, and 2nd gear to 1st gear, and dash portion 583 is shown for the down shift from 1st gear to neutral. In these successive down shifts, detent 526 successively engages in sockets 5, 4, 3, 2, 1, R and N in the order named; and detents 531 and 532 alternately engage inclined surfaces 577.4, 577.3, 577.2, 577.1, 577R and 577N. As will be understood, the length and pitch of these inclined faces determine the speed at which down shifting occurs between each set of gears and also the position and shape of the recesses determine the rate and extent of progressive decoupling and coupling of the two fluid couplings involved in each shift operation. As illustrated in Figure 16, down shifting from 5th gear to 4th gear starts at about 45 M. P. H. vehicle speed, and successive down shifting from 4th to 3rd to 2nd to 1st and to neutral positions occur at vehicle speeds of approximately 29, 18, 12 and 3 M. P. H. respectively.

The automatic shift operation depicted in Figure 16 occurs with the foot pedal in its more or less medial side to side position such as indicated in Figure 17 as the normal engine speed range. As will be understood shifting, either up-shifting or down-shifting, may be manually controlled by the foot lever at the will of the operator by displacing the foot pedal to the left or to the right as viewed in Figure 2. Movement of the foot pedal to the right, as illustrated in Figures 2 and 17, provides for upshifting in each gear at higher relative engine speeds. For example, if the foot pedal is swung approximately 21 degrees to the right of its leftmost or neutral position, as illustrated in Figure 17, to a position therein designated as within a high engine speed range, abbreviated as "High ESR," the vehicle will start out and accelerate until a speed of approximately 24 M. P. H. is reached, when up-shifting to second gear will occur. In Figure 17, the abscissa at the base of the chart is marked off in degrees of swing of the foot pedal 501, which is diagrammatically illustrated for clarity at the lower portion of the view. The first approximately one degree of pedal movement is denoted as a "Neutral" engine speed range; the next approximately one degree of pedal movement is denoted as an "Idle" engine speed range with the phrase "engine speed range" generally abbreviated herein as "ESR." The next approximately five degrees, three degrees, approximately 16 degrees, and further pedal movement are denoted as "Low ESR," "Normal ESR," "High ESR," and "Extreme ESR," respectively. The ordinate at the left of the chart is marked off in vehicle M. P. H. (miles per hour). The abscissa at the top of the chart is marked off in engine R. P. M. corresponding to the engine speed ranges noted at the bottom of the chart. Extending from the lower, 0, corner of the chart are five upwardly inclined lines 676, 677, 678, 679 and 680 representing operations of the vehicle in first, second, third, fourth, and fifth gears respectively, these gears and their gear ratios (engine to axle) represented thereby, viz. 12.61, 8.50, 5.66, 3.61 and 2.36 respectively, are denoted at the right hand, upper terminal ends of the lines 676–680.

Returning to a description of the shift pattern depicted in Figure 17, it will be seen that with the foot pedal in high engine speed range, as for example at a laterally displaced position of 21 degrees, vehicle operation is depicted along line 676 from 0 to a vehicle speed of approximately 24 M. P. H. and an engine speed of 3600 R. P. M. At this point up-shifting will occur to second gear as more fully hereinabove describe, engine speed reduced and operation will continue as depicted along line 677 until the vehicle speed reaches approximately 36 M. P. H. (3600 R. P. M.) when upshifting will occur to third gear. Operation then continues as indicated along line 678 until a vehicle speed of approximately 54 M. P. H. is reached when upshifting occurs from third to fourth gear. Vehicle operation then occurs along line 679 until a vehicle speed of approximately 84 M. P. H. is reached when upshifting occurs from fourth to fifth gear. The vehicle operation will then continue as indicated along line 680.

Swinging of the foot pedal further to the right to the position indicated as "extreme engine speed range" which is approximately 30 degrees to the right of the leftmost neutral position will delay upshifting from first gear to second gear (as seen along ordinate 28°, 4800 R. P. M.) until the vehicle speed has reached about 32 M. P. H. and successive up-shifting from 2nd to 3rd and from 3rd to 4th gear will occur at approximately 49 M. P. H. and 74 M. P. H. respectively. Conversely, swinging of the foot pedal to the left of its normal engine speed range will cause up-shifting at a relatively lower forward vehicle speed. For example a displacement of approximately 7 degrees to the right of the leftmost neutral position will cause up-shifting from 1st to 2nd to 3rd to 4th and to 5th gear at vehicle speeds of 8, 12, 18, 28 and 44 M. P. H. respectively.

Accordingly, as will be understood from Figure 17, the driver of the vehicle is afforded complete and continuous control of the engine speed range by sidewise displacement of the foot pedal 501 so as to obtain an infinite shift pattern within the whole range depicted in Figure 17.

In a multi-speed transmission of the present character it is desirable that the overall gear change be divided into fairly even intermediate gear changes so as to provide substantially even steps in successive gear changes. This results in the setting up of a fairly uniform constant ratio between the upper and lower engine speeds at which shifting occurs. In the present transmission the design is such that this ratio is roughly 3 to 2. Accordingly since the ratio of engine speeds is substantially constant, the difference in engine speeds, or the engine speed change, during shifting operations increases at higher engine speeds. This is generally represented in the chart in Figure 17 by the horizontal dimension between the several inclined lines 676–680. This variation in change in engine speed in shifting between gears under different conditions is accompanied by a difference in range of pump fluid pressure by reason of the proportional output pressure characteristic of the fluid pumps to shaft speed. Also, as will be observed, the multiple position governor valve 433 is required to move a constant distance for each shift operation, and this movement is in turn controlled by fluid pressure. Accordingly, and as an important feature of the present invention, the spring 434 is constructed to provide progressively increased resistance to compression at progressively higher pump pressures corresponding to the progressive increase in engine speed change in effecting shifting operations at higher engine speeds. This is here accomplished by successively stepping the diameters of the spring convolutions and by progressively thickening the cross-section of such convolutions and by progressively supporting the convolutions from one end during compression, all co-acting to progressively increase the rate of resistance to compression of the spring with increased compression. As shown in Figure 8, spring 434 is of generally conical form with its widest diameter base end 681 mounted on a spring seat 682 provided on piston 468. The next adjacent convolution 683 is of slightly smaller diameter and also of slightly thicker cross-section. The succeeding convolutions are similarly stepped down in diameter and increased in thickness of cross-sectional area so as to increase their resistance to torsional strain. Also, as will be observed from Figure 8, seat 682 is formed as a spiral underlying the convolutions of the spring. Accordingly, as the spring is compressed, the convolutions will be progressively supported on seat 632 starting with the left end convolution 681.

As an important feature of the present invention the accelerator pedal 501 is mounted and arranged so as to co-act with other parts, whereby it will automatically swing to the left, as viewed in the drawings, when the operator of the vehicle raises his foot from the accelerator pedal. This operating is under the control of the pedal centering spring 508 which functions not only to constantly urge the pedal to a medial side to side position in the so-called normal engine speed range, but also to constantly urge the pedal to swing upwardly so as to engage the roller bearing 512 at its upper end 537 against the inclined track or guide 511, which is inclined upwardly to the left, as seen in Figure 17, so as to cause a swinging of the accelerator pedal to the left, when downward foot pressure on the pedal is released.

The connection of the accelerator pedal 501 to the throttle rod 588 leading to the carburetor butterfly valve (not shown) is effected by an inclined track 589 mounted at the underside of the accelerator pedal, and which engages a roller 591 at the extremity of rod 588. As will be seen from Figures 1, 2 and 17, track 589 is arranged with its length extending substantially perpendicular to the length of the accelerator pedal in the same manner as guide 511, so as to cause a depression of the rod 588 upon depression of the pedal 501 in all of its transverse positions. When the operator's foot is removed from the pedal 501, track 589 becomes disengaged from roller 591, a clearance 592 being provided for this purpose, so as to insure complete closing of the carburetor valve by spring 593 connected to rod 588. It is important that this clearance be maintained in all side to side positions of the foot pedal; and accordingly, the track 589 is arranged on an incline generally parallel to guide 511.

The lower end of spring 508 is here mounted in a substantially U shape adjustor member 509 (see Figure 24) which is provided with set screws 596 and 597 bearing against opposite sides of the spring 508, and which may accordingly be positioned to control the medial position of the foot lever controlled by the spring. By means of this adjustment, the foot pedal may be displaced to either the left or the right from the position indicated so as to set the normal engine speed range as desired by the operator.

Movement of the foot pedal 501 to the right without depressing the pedal causes a shifting into low gear as above explained. In its far right position, the transmission is kept in low gear regardless of engine speed because full pump pressure is applied to cylinder end 472 against piston 468 which has a greater surface area presented to the high pressure than does piston 467. Accordingly, pump pressure urges piston 468 to the right fully compressing spring 434 thereby forcing valve 433 to the right, as viewed in Figure 8, and introducing pump fluid pressure in cylinder end 447 of the hydraulic actuator, and thereby causing the latter and the shifter valves connected thereto to move to the right. In order to prevent the latter travel of the actuator from going into neutral position, the far right pedal movement also swings rollers 494 into the path of the low gear stop face 518 on cam 498, see Figures 9 and 10. This stops the shifter in low gear position. It remains there until the pedal is moved far enough leftward to permit valve 477 to release pressure on piston 468, thus releasing the governor spring 434. The governor piston 467 can then shift the transmission into higher gears as engine speed is increased.

*Idling*

Idling is obtained when the foot pedal 501 in its left position is permitted to move to the left to a recessed flat portion 601 of the guide 511 at the upper extremity of the inclined portion thereof. The portion 601 is sufficiently wide to define an idling position 602 of the roller 512 contiguous to the upper inclined end 603 of the guide 511, and a neutral position 604 to the left of idle position 602 with the roller 512 positioned against a side 606 of the guide. In the apparatus and performance chart illustrated in Figure 17, the mechanism is designed to disengage all of the gears in the idle position 602, when the engine speed falls below about 400 R. P. M., except the reverse gear 34 which is put into operation only under circumstances later described. At this speed, the pressure in the governor cylinder 471 is low, causing spring 434 to move the valve piston 467 to the right, thereby causing a rightward movement of the hydraulic actuator 427 and connected shifter valve until the slope 520 of cam face 498 engages rollers 494 which are rotated into alignment with this portion of the cam when the foot pedal is in idle position 602. The assembly is held in this position by detent 526 engaging in socket R.

Neutral position

Neutral position is obtained by movement of the foot pedal 501 to neutral position 604. This moves valve 477, see Figure 8, to the right so as to uncover passage 607 communicating pump pressure port 441 to reservoir passage 349, thereby releasing the pressure in cylinder end 471. A restriction 470 serves to retain pressure in port 442 to affect a full rightward displacement of the hydraulic actuator 427. Accordingly, in this position, no displacement of the hydraulic actuator and no up-shifting of the transmission will occur. This neutral position of the accelerator pedal is used among other instances for starting of the engine by pushing latch 421 through its neutral socket in dial 401, thereby closing switch 418 and energizing the starter relay 419 (see Figure 1). The accelerator pedal is retained fully left as the engine is placed in operation. In this fully left neutral position 604 of the foot pedal, rollers 494 are rotated into alignment with the cam recess 519 for engagement with neutral portion 521 of cam 498, thereby permitting whole rightward movement of the hydraulic actuator and shifter valves thereby releasing fluid pressure in all of the fluid couplings including the coupling mounted in reverse gear 34.

Stalling

The engine speed range position of the pedal 501 between neutral and low gear can be used to slip the fluid coupling for the low gear for speeding up of the engine during warm-up to prevent stalling. This is accomplished by pushing the throttle down to speed up the engine and easing the pedal rightwardly from neutral, thus moving valve 477 to begin opening port 484 and closing passage 607. This chokes off the by-passing of fluid under pump pressure to the reservoir, thus increasing pressure in cylinder 471. The governor will therefore motivate the shifter unit to close the low gear coupling discharge orifices. As the low gear coupling takes hold, driving the vehicle, the motor may slow down. If engine speed slows to imminent stalling, a leftward foot movement (with the throttle still down) will again open the neutral passage 607, thus releasing any pressure in cylinder 471. The governor will therefore motivate the shifter valve to begin opening the discharge orifices of the low gear fluid coupling, thus releasing the vehicle load to allow the engine to speed up again. Easing of the pedal sidewise in this manner produces the same effect on the engine to vehicle engagement as that obtained by a driver when slipping a conventional type clutch to maintain engine speed during warm-up or quick starts.

Braking

Braking of the forward vehicle speed can be controlled by moving the pedal 501 sidewise while the vehicle is slowing down. When driving at the normal sidewise setting of the pedal 501, that is in the normal engine speed range previously described, letting up of the throttle effects the automatic shift toward low gear. Removal of downward pressure on the throttle permits the spring 508 to urge the roller 512 against the slope of guide 511 and leads the pedal 501 to the idle engine speed range position 602. Thus for normal braking the driver need not move pedal 501 from the normal speed range, because in such range the transmission will downshift and utilize the low gear for braking until the engine is automatically (or ordinarily) released from low gear at about 300 R. P. M., corresponding to a vehicle speed of about 3 M. P. H. If more controlled engine braking is desired, the pedal 501 may be moved to the left, as to the low engine speed range, wherein down shifting will occur at an engine speed of approximately 450 R. P. M. This movement of the pedal 501 to low engine speed range displaces valve 477 to the left, as viewed in Figure 8, releasing most of the pressure in cylinder 472 to reduce the compressive force exerted on the spring 434, which permits pump pressure in cylinder 471 to move piston 467 to the left, resulting in the hydraulic actuator 427 driving the shifter valves to their leftmost position, thus holding the transmission in 5th gear until the engine slows down to about 450 R. P. M., corresponding to a vehicle speed of about 15 M. P. H., see Figure 17. At this point, further compression of governor spring 434 will overcome the pump pressure and cause down-shifting through 4th, 3rd, 2nd and low gears, as the vehicle is brought to a stop. Low gear will disengage into idling engine speed range position at about 400 R. P. M., and at a vehicle speed of approximately 3 M. P. H. unless the pedal 501 is quickly moved far right to retain the transmission in low gear where complete stopping may be effected by turning off the ignition.

If more severe engine braking is desired, the accelerator pedal 501 may be swung to the right, as viewed in Figures 2 and 17. This moves the valve 477 to restrict the release of pressure in cylinder 472, causing the pump to build up pressure on piston 468 to compress spring 434. The governor piston 467 is thus forced to the right, see Figure 8, resulting in shifter valves being moved to the right to engage successively lower gears. At a furthermost rightward position of pedal 501, the transmission is forced into first gear and is held therein against movement into idle or neutral position by the stop rollers 494 as hereinabove described. The torque meter valves 356 and 357 function to avoid undue strain on the vehicle axle and drive shaft in severe engine braking conditions.

As will be understood, the control of the infinite shift pattern, here provided by the side to side movement of the accelerator pedal, may be effected by any other suitable control, either manual or automatic, which will cause the desired reciprocation of the valve 477.

As hereinabove noted, the transmission is adapted for manual shifting as well as for automatic shifting, and it is a feature of the present invention that the operator may take over manually and shift to any desired gears regardless of the position of the transmission shift mechanism or the influence exerted thereon by the governor. This is here effected (see Figure 8) by the provision of check valves 611 and 612 in fluid passages 613 and 614 extending through the piston 427 of the hydraulic actuator. The valves 611 and 612 are normally spring biased to closed position for automatic operation of the governor, as above described. However, manual grasping and rotation of the hand wheel 401 to effect displacement of the shifter valve, as hereinabove described, to select a desired gear forces a displacement of the hydraulic actuator; valves 611 and 612 opening, as the case may be, to pass fluid around the piston 427 and permit movement thereof. For example, with the hydraulic actuator in 4th gear position, as illustrated in Figure 8, rotation of the hand wheel 401 in a counterclockwise direction will force the hydraulic actuator to the left. In such case, valve 611 opens against the resistance of its closing spring 616 to bypass fluid around piston 427. On the other hand, rotation of hand wheel 401 in a clockwise direction will forcibly displace the hydraulic actuator to the right, as viewed in Figure 8. In such case, valve 612 opens against the resistance of its closing spring 617 to bypass fluid around piston 427.

Towing

Towing of the vehicle with a dead engine may be accomplished by locking the hand wheel 401 in neutral position by means of latch 421. In this position the propulsion shaft 22 is free to rtotate at any speed.

Coasting

Coasting of the vehicle may be accomplished with the transmission either in neutral or idle position of the foot pedal. Idle position has the advantage of permitting instantaneous access to engine braking by a rightward movement of the pedal.

Pushing

Pushing or towing of the vehicle to effect starting of the engine may be accomplished by shifting the transmission to, say, 3rd gear by means of hand wheel 401. Movement of the vehicle drives the propulsion shaft and its pump, and output pressure is assured regardless of the rotation of the propulsion shaft by reason of the unidirectional valve system 374, 375, 378 and 379 hereinabove described. The foot pedal 501 is used for shifting to neutral after the engine is started.

Reverse

Since the transmission automatically advances through the forward speeds with increased engine speed, as hereinabove described, special provision is made in regard to the operation of the reverse gear, so that this gear is normally retained out of engagement; and when it is placed in engagement, all of the other (forward) gears are and remain de-energized. The reverse operation, as above noted, is controlled by idler gear 35 which is in constant mesh with gear 33 on the main shaft 21 and slides longitudinally in mesh with gear 33, into and out of mesh with gear 34 on the propulsion or output shaft 22. With reference to Figure 3, it will be noted that movement of gear 35 to the left causes a coupling of gears 33 and 34 driving the propulsion shaft 22 in a reverse direction; contrariwise, movement of gear 35 to the right effects its disengagement from gear 34, so as to decouple gears 33 and 34. Normally gear 35 is moved to its rearward decoupled position by spring 621 surrounding an idler shaft 622 journaling idler gear 35 and compressed between a shoulder 623 on the shaft and a bearing part 624 slidably mounted on the shaft 622 and carrying gear 35.

Movement of gear 35 into coupling position is effected by a solenoid 626 having its field winding 627 supported in surrounding relation to shaft 622 and in surrounding relation to bearing part 624, which forms the movable armature or central core of the solenoid. Accordingly, when the winding 627 is energized, the armature core part 624 will be drawn to the left against the resistance of spring 621, thereby bringing gear 35 into mesh with gear 34, thus coupling gears 33 and 34 for reverse operation. Gears 34 and 35 are beveled at their engaging edges, as illustrated in Figure 3, for facilitating enmeshing of the teeth.

The means for de-energizing the fluid coupling for the forward speeds during reverse operation is as follows: an electrically controlled latch mechanism 632, see Figures 3 and 4, functions when energized to engage the shifter mechanism when in reverse position and positively prevents its advancing leftward from such position and into the several forward speeds. Preferably, this electrically controlled latch is controlled by a second manually operated position of the ignition switch of the vehicle (see Figures 2 and 15) so that the shifting into reverse is always a deliberate and never an accidental occurrence.

The electrically controlled latch 632, as will be best seen in Figures 3 and 4, consists of a solenoid 633 mounted adjacent to the sliding bearing 413 on shaft 414, forming part of the manual shifting mechanism above described, and which displaces, when energized, a stop bar 634 into engagement behind a shoulder or stop 636 provided on bearing part 413 to thereby retain the latter against leftward movement as seen in Figure 3. Energizing of solenoid 633 is under the control of a switch 637, which is normally open and which is closed by engagement and displacement by bearing part 413 so that the solenoid is operated only when the shifter mechanism is displaced to the right to either reverse or neutral position.

Figure 15:
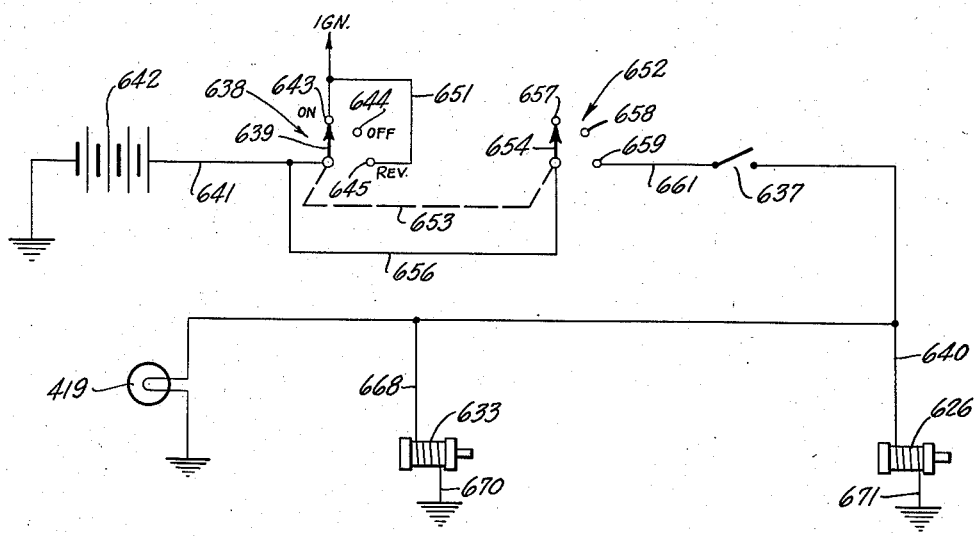
Figure 15 is a schematic wiring diagram of certain of the electrical parts used in the transmission.

The operation of the auxiliary control for the reverse gear will be best understood with reference to the electrical schematic diagram of Figure 15. As therein illustrated, the ignition switch 638 is a single pole, three position switch having the moving or selector contact 639 connected by conductor 641 to the battery 642 of the vehicle, and movable into engagement with contacts 643, 644, and 645 delineated on the drawing on the "on," "off" and "reverse" positions respectively; it being noted that "on" and "reverse" contacts 643 and 645 are on opposite sides of "off" contact 644 and are connected by conductor 651 to each other and to the ignition circuit. A second single pole, three position switch 652 is mechanically connected in tandem as indicated by dash line 653 for simultaneous operation with switch 638. Switch 652 has its moving contact 654 connected by conductor 656 to the selector contact 639 of ignition switch 638, and selector contact 654 is movable into successive engagement with contacts 657, 658 and 659. Contacts 657 and 658 are left open while contact 659, which is energized in the reverse position of ignition switch 638, is connected by conductor 661 to the latch switch 637. Accordingly, swinging of the ignition switch 638 to its reverse position connects switch 637 to battery 642, and, when the latter switch is closed, the electrical circuit is completed from battery 642 through conductor 640 and ground conductor 671 to the solenoid 626 to cause a shifting of the reverse idler gear into engagement with gear 34, and energizing of solenoid 633 through conductor 668 and ground conductor 670, to prevent upshifting as aforesaid. Accordingly, after the solenoid 626 is energized to place the reverse gear in operation, it is only thereafter de-energized to cause a shifting out of reverse gear when the ignition switch 638 is manually and deliberately swung away from its reverse position. When this is done, a spring 672 raises the stop bar 634 so as to disengage the shifter mechanism for its automatic movement into the forward speeds, as above described. An electrical buzzer (not shown) may be incorporated in the circuit for indicating to the driver that the ignition switch is in reverse position, and also a back-up light 419 may be similarly included in the circuit.

In accordance with the present invention additional latching means is provided for holding the stop bar 634 against release of the shifter mechanism, until the shifter mechanism is moved into a neutral position fully releasing the reverse gear drive and de-energizing its fluid coupling, before shifting into forward speed takes place. This is here accomplished by providing a locking dog 673 which is mounted and spring-biased to move or swing over the top of the stop bar 634 and retain the latter in its interlocking position behind the shoulder 636, and is raised from such latching position only when the shifter mechanism is moved to neutral position. With reference to Figures 3 and 4 it will be seen that the stop bar 634 is pivoted intermediate its ends on a bracket 686 carried by casing 155 so that one end 687 may swing in a vertical plane into and out of a retaining position behind shoulder 636, and the opposite end 688 of the bar is operatively displaced by one end of the moving armature 689 of the solenoid 633, it being noted that spring 672 is also connected to bar end 688 so as to normally hold the opposite bar end 687 in elevated position with respect to shoulder 636. Upon energizing of solenoid 633 armature 689 moves against bar end 688, displacing the latter upwardly, as seen in Figure 4, against the resistance of spring 672 so as to thereby swing the opposite bar end 687 down behind the shtoulder 636.

Locking dog 673 is here pivotally mounted on bracket 686 so as to swing in a plane perpendicular to the stop bar 634 and is provided with an offset hook portion at its upper end formed to latch over the top of bar 634 when rotated counterclockwise—to the left—as seen in Figure 3. This latter movement of the locking dog is normally produced by a spring loaded plunger 691 mounted for reciprocation in the upper wall 154 of the casing and projecting therefrom for engagement with the upper end of the locking dog as seen in Figure 3. Accordingly, upon movement of the shifter mechanism to reverse position, solenoid 633 will cause the stop bar 634 to move downwardly behind shoulder 636 and the locking dog 673 will be displaced forwardly by a plunger 691 into latching position over the top of the bar 634. The latch bar 634 is thus thereafter retained in its interlocked position independently of the energizing of solenoid 633 and will be so retained to lock the shifter mechanism in reverse gear until locking dog 673 is displaced rearwardly from its engagement with bar 634. This latter displacement is arranged to be effected when the shifter mechanism moves to neutral position. As here shown, one of the trunnion pins 692 providing the operable connection between crank 412 and bearing part 413, is extended laterally, as seen in Figure 4 for engagement with the locking dog 673 intermediate its length, and the parts are so proportioned and arranged that pin 692 will displace dog 673 away from its overlaid position on the bar 634 when the shifter mechanism moves to neutral position. When this occurs and when the ignition switch is turned to de-energize solenoid 633, the stop bar 634 will spring up to release the shifter mechanism for movement into the forward speed position.

The transmission of the present invention is ideally adapted for the addition thereto of a sensory control which may function to automatically change the shift pattern or range as more fully discussed above automatically in response to grade, road and temperature conditions encountered by the vehicle. Such an arrangement is illustrated in the modified form of the invention illustrated in Figures 19 to 23. In the arrangement there illustrated a fluid motive means 701 is operatively connected to the valve driver member 492 for the governor so that the speed range or shift pattern of the transmission may be controlled by the motive means 701, and the latter is in turn connected to and operated by fluid pump means 702 and 703 which are responsive to the grade and load conditions imposed on the vehicle. The motive means 701 and the pump means 702 and 703 may each be formed as a simple flexible diaphragm type motive unit as illustrated in Figure 22, and a description of this unit will suffice for each of the units 701, 702 and 703.

Each unit consists of a housing 704 having an enlarged bell end 706 cooperating with a diaphragm 707 sealed in its periphery to the periphery of end 706 to define a fluid chamber 708. The outer side of diaphragm 707 is exposed to the atmosphere and is partially covered by a guard 709. Mechanical connection to the diaphragm 707 is effected by a connector 711 fastened at its center and having an exteriorly arranged boss 712 and an interiorly arranged stem 713 which is mounted for axial reciprocation in a tubular portion 714 of the housing.

Resilient centering means is preferably provided for normally urging the diaphragm 707 to a medial position as here shown. Helical springs 716 and 717 are provided on the stem 713 for this purpose. Spring 716 is compressed between a ring seat 718 mounted for reciprocal movement on the stem to and from a shoulder 719, and a ring seat 721 fixedly carried in a groove in the stem. As will be observed from Figure 22, ring 718 projects outwardly to engage a shoulder 722 provided by the housing so that a leftward movement of the stem as seen in the figure will cause a compression of spring 716. Spring 717 is normally compressed between spring seat 721 and a ring spring seat 723 mounted for reciprocation on the stem to and from a stop provided by the head of a screw 724. As will be observed from Figure 22, seat 723 projects outwardly so as to engage a stop provided on the housing (here the end of closure cap 726) so that a rightward movement of the stem 713 will cause a further compression of spring 717. Accordingly springs 716 and 717 act to constantly urge the diaphragm 707 and connector 711 to a medial position. Fluid is passed into the chamber 708 or removed therefrom by means of a fluid connection provided by a fitting 727. Preferably the fluid connection is made through a reduced aperture 728 so as to dampen momentary pulsations which may be set up in one of the pump units. The motive unit 701 has its exterior boss 712 pivotally connected to a lever 503a which corresponds to lever 503 above described, and is provided with a pivotal attachment at one end to a driver member 492 and at its opposite end to link 504a which corresponds to link 504 above described leading to the accelerator pedal. Accordingly, it will be seen that with the accelerator pedal in any preset lateral position, reciprocation of the diaphragm of unit 701 will cause a corresponding reciprocation of driver unit 492. More specifically, a reduction of pressure in fluid in chamber 708 of unit 701 will produce a contraction of the chamber and a rightward movement of the diaphragm as viewed in Figure 21, thereby inwardly displacing member 492. The effect of this latter movement, as more fully above described, is to delay the up-shifting of the transmission until relatively higher engine speeds are reached. This is desirable, of course, when the vehicle is proceeding upgrade or under load conditions or when the climate is unusually cold.

Fluid pump means 702 is rendered responsive to the grade encountered by the vehicle by operatively connecting the exterior portion 712 of the diaphragm of that unit to the arm 729 of a pendulum having a depending weight 731. As will be seen in Figures 19–21, the upper end of arm 729 is pivotally secured to a bracket 732 fixed to the transmission housing. Connection of the diaphragm of unit 702 to the pendulum arm 729 is effected by a link 733. Accordingly, and as will be best observed from Figure 20, an uphill inclination of the vehicle will cause the pendulum arm 729 to swing in a clockwise direction, thus pulling on the diaphragm of unit 702 and expanding the chamber 708 thereof. Connection of this chamber is effected to the chamber of the motive unit 701 by a conduit 734, thus producing a contraction movement of the diaphragm of the latter unit to in effect cause a relative down shifting of the transmission so as to meet and better operate over the grade encountered. Conversely, when the vehicle reaches the top of the grade and levels out the pendulum operated fluid pump 702 will cause a relative up-shifting of the transmission. In order to prevent uncontrolled or erratic swinging of the pendulum such as when traversing rough terrain, the pendulum may be connected as here shown to a conventional type dash pot 736 by means of a link 737 connecting the movable element of the dash pot to the weight 731.

Fluid pump unit 703 is rendered responsive to the load imposed on the vehicle by supporting the housing of the unit on a fixed part of the running gear such as the differential housing of the vehicle, and by operatively connecting the movable diaphragm connection 712 of the unit to the body of the vehicle so that a relative displacement of the diaphragm is effected as the body 739 changes its position with respect to the differential housing 738 under different load conditions. As will be understood, the body 739 will normally be spring supported so that it will be automatically responsive in its position to the load placed on the body. As here shown, connection of the movable part 712 of unit 703 to the body 739 is effected by a lever 741 pivoted at one end to a bracket 742 on the body, intermediate its length to a bracket 743 on the differential housing 738 and at its opposite end to a link 744 connected to the exterior part 712 of the diaphragm of unit 703. Accordingly and as will be best observed from Figure 20, a downward movement of body 739 as when under increased load causes a relative upward movement of the diaphragm 707 in unit 703, thereby expanding chamber 708 therein. This chamber is connected to the fluid chamber of the motive unit 701 by a conduit 746. It will thus be seen that the imposition of load on the vehicle will produce a relative downshifting of the transmission and conversely, a relative lightening of the load will produce a relative up-shifting of the transmission.

In order to check undesirable fluid pulsation due to vibration of lever 741 while the vehicle is traversing rough terrain, the lever 741 is preferably in the form of a spring so as to absorb both vibration and bounce. Also, the fluid restrictions 728 provided at each of the units serve to dampen such pulsations as will be generated.

As a further feature of the sensory control, I use an operating fluid having a relatively high thermal coefficient of expansion so that the system is rendered responsive to change in temperature as well as grade and road conditions. As will be understood, all of the units are connected in a common closed fluid circuit. Accordingly, contraction of the fluid itself as a result of reduced temperature effects a displacement of the motive unit 701 and the valve driver member 492 in exactly the same manner as an increase in grade or an increase in load. Conversely, an increase in temperature will be accompanied by an expansion of the operating fluid and a relative upshifting of the transmission in the same manner as occurs upon decreasing the grade and load encountered by the vehicle.

Since all of the units operate simultaneously in a closed circuit they are additive in their function and effect, and automatically supplement or compensate each other. Accordingly the torque transmitted by the transmission will be automatically increased as a function of increased grade encountered by the vehicle, and will be further increased if the vehicle is under load or operating under cold conditions, or will be relatively and cumulatively decreased if any or all of the three conditions are reversed.

A fluid take-up means 747 is here provided in the fluid circuit (see Figures 19 and 23) for replacing fluid as may escape by reason of leakage. The unit 747 here consists of a collapsible fixed casing which may be formed of rubber, neoprene or the like arranged in the fluid circuit, as illustrated, and which may be relatively compressed by nut and bolt means as illustrated.

In order to insure that the operator may at all times be able to shift the transmission into neutral position, notwithstanding the position of diaphragm 707 of the motive unit 701 as controlled by the sensory controls 702 and 703, arm 503a is preferably formed with a fulcrum shoulder 752 which is engageable with the cover 709 of the actuator unit 701 so as to provide an auxiliary fulcrum for the arm, and thereby insure the operator's ability to swing the lower end of the arm sufficiently to shift the transmission into neutral notwithstanding that the sensory controls 702 and 703 may have caused a movement of the diaphragm 707 to a rightward position, as viewed in Figures 21 and 22, which would otherwise prevent swinging of arm 503a sufficiently to shift the transmission into neutral position.

I claim:

1. In a gear shifting mechanism, a pair of shafts, a member mounted on one of said shafts for rotation and having a concentric exterior periphery, an external ring gear member having a concentric internal periphery mounted for rotation on said exterior periphery of said first-mentioned member, a gear carried on the other of said shafts being enmeshed with said gear member, one of said members being formed with a plurality of circumferentially spaced axially extending open-ended cylinders, pistons mounted for reciprocation in said cylinders, spring means normally retracting said pistons from the open ends of said cylinders, the other of said members having an annular cam face extending across said cylinder ends for engagement with said pistons when extended to said open ends and being inclined to the axis so as to oscillate said pistons when so extended upon relative rotation of said members, and means charging said cylinders with a fluid so as to extend said pistons and restricting the discharge of said fluid therefrom so as to restrain the oscillation of said pistons and to couple said members and said gear for rotation.

2. In a gear shifting mechanism, a plurality of members mounted for rotation and each formed with a concentric exterior bearing surface, an external ring gear having a concentric internal bearing surface journaled for rotation on each of said exterior bearing surfaces, a plurality of gears constantly enmeshed with said ring gears, each of said members being formed with a plurality of circumferentially spaced axially extending open-ended cylinders, pistons mounted for reciprocation in said cylinders, spring means normally retracting said pistons from the open ends of said cylinders, said ring gears having annular cam faces extending across the cylinder ends for engagement with said pistons when extended to said open ends and being inclined to the axis so as to oscillate said pistons when so extended upon relative rotation of said ring gears and members, and means selectively charging the cylinders in each of said members with fluid so as to extend the pistons therein into engagement with the adjacent cam face and to restrict the discharge of fluid from said last-named cylinders so as to couple said last-mentioned member and its ring gear and the enmeshed gear for rotation.

3. In a gear shifting mechanism, a hollow shaft, a plurality of members mounted on said shaft for rotation therewith and each formed with a concentric exterior bearing surface, an external ring gear having a concentric internal bearing surface journaled for rotation on each of said exterior bearing surfaces, a plurality of gears constantly enmeshed with said ring gears, each of said members being formed with a plurality of circumferentially spaced axially extending open-ended cylinders and with passages connecting said cylinders to spaced inlet and discharge ports at the internal periphery of said shaft, pistons mounted for reciprocation in said cylinders, spring means normally retracting said pistons from the open ends of said cylinders, said ring gears having annular cam faces extending across the cylinder ends for engagement with said pistons when extended to said open ends and being inclined to the axis so as to oscillate said pistons when so extended upon relative rotation of said ring gears and members, a slide valve mounted interiorly in said shaft and having a passage adapted for connection to a source of fluid under pressure and movable into a plurality of positions selectively registering said passage with said inlet ports and in said positions selectively restricting said discharge ports whereby in each of said positions the cylinders of one of said members will be charged with fluid so as to extend the pistons therein into engagement with the adjacent cam face and the discharge of fluid from said last-mentioned member will be restricted so as to couple such member with its surrounding ring gear.

4. In a gear shifting mechanism, a hollow shaft, a plurality of members mounted on said shaft for rotation therewith and each formed with a concentric exterior bearing surface, an external ring gear having a concentric internal bearing surface journaled for rotation on each of said exterior bearing surfaces, a plurality of gears constantly enmeshed with said ring gears, each of said members being formed with a plurality of circumferentially spaced axially extending open-ended cylinders and with passages connecting said cylinders to spaced inlet and discharge ports at the internal periphery of said shaft, pistons mounted for reciprocation in said cylinders, spring means normally retracting said pistons from the open ends of said cylinders, said ring gears having annular cam faces extending across the cylinder ends for engagement with said pistons when extended to said open ends and being inclined to the axis so as to oscillate said pistons when so extended upon relative rotation of said ring gears and members, a fluid pump mounted interiorly of said shaft for supplying fluid under pressure, a slide valve mounted interiorly of said shaft and having a passage connected to said pump and being movable into a plurality of positions selectively registering said passage with said inlet ports and selectively restricting said discharge ports whereby in each of said positions the cylinders of one of said members will be charged with fluid so as to extend the pistons therein into engagement with the adjacent cam face and the discharge of fluid from said last-mentioned member will be restricted so as to couple such member with its surrounding ring gear.

5. In a gear shifting mechanism, a hollow shaft, a plurality of members mounted on said shaft for rotation therewith and each formed with a concentric exterior bearing surface, an external ring gear having a concentric internal bearing surface journaled for rotation on each of said exterior bearing surfaces, a plurality of gears constantly enmeshed with said ring gears, each of said members being formed with a plurality of circumferentially spaced axially extending open-ended cylinders and with a plurality of passages connected to said cylinders and communicating with a plurality of axially extending passages provided in said shaft, said axially extending shaft passages terminating in a plurality of sets of ports opening to the internal periphery of said shaft, each of said sets being composed of circumferentially spaced inlet and outlet ports arranged in a transverse plane with said sets being in adjacent axially spaced relation at said shaft internal periphery, pistons mounted for reciprocation in said cylinders, said ring gears having annular cam faces extending across the cylinder ends for engagement with said pistons and being inclined to the axis so as to oscillate said pistons upon relative rotation of said ring gears and members, a slide valve mounted on said internal shaft periphery and having a valve port adapted for connection to a source of fluid under pressure and movable into a plurality of positions selectively registering said valve port with said inlet ports and in said positions selectively restricting said discharge ports whereby in each of said positions the cylinders of one of said members will be charged with fluid so as to extend the pistons therein into engagement with the adjacent cam face and the discharge of fluid from said last mentioned member will be restricted so as to couple such member with its surrounding gear.

6. In a gear shifting mechanism, drive and driven shafts, a plurality of sets of constantly enmeshed gears carried by said shafts for rotation therewith save one gear in one set being journaled for free rotation on said drive shaft and one gear in another set being journaled for free rotation on said driven shaft, a plurality of fluid coupling means each connecting one of said last-mentioned freely journaled gears and shafts and each including control means for selectively coupling and decoupling said last-mentioned gears to their shafts, and means operatively connected to said control means to simultaneously couple said one gear in one set with said drive shaft and uncouple said one gear in said another set with said drive shaft to thereby effect shifting from one of said sets to another.

7. In a gear shifting mechanism, drive and driven shafts, a member mounted for rotation on each of said shafts and being formed with a plurality of circumferentially spaced axially extending open-ended cylinders, pistons mounted for reciprocation in said cylinders, an external ring gear journaled for rotation co-axially with each of said members and provided with an annular cam face extending across the cylinder ends for engagement with said pistons and being inclined to the axis so as to oscillate said pistons upon relative rotation of said ring gear and associated member, a gear fixed for rotation with said drive shaft and enmeshed with the ring gear on said driven shaft and a different-size gear fixed for rotation on said driven shaft and enmeshed with the ring gear on said drive shaft so as to thereby provide sets of constantly enmeshed gears of different gear ratios, and means adapted for connection to a source of fluid under pressure and movable into first and second positions selectively charging the cylinders in each of said members in one of said positions with fluid so as to extend the pistons therein into engagement with said adjacent cam face and to restrict the discharge of fluid from said last-mentioned cylinders so as to couple said last-named member and its associated ring gear and thereby providing upon movement from one position to the other a shifting from one of said gear sets to the other.

8. In a gear shifting mechanism, drive and driven shafts of hollow form, a member mounted for rotation on each of said shafts and being formed with a plurality of circumferentially spaced axially extending open-ended cylinders and with passages connecting said cylinders to inlet and discharge ports at the internal periphery of its associated shaft, pistons mounted for reciprocation in said cylinders, an external ring gear journaled for rotation co-axially with each of said members and provided with an annular cam face extending across the cylinder ends for engagement with said pistons and being inclined to the axis so as to oscillate said pistons upon relative rotation of said ring gear and associated member, a gear fixed for rotation with said drive shaft and enmeshed with the ring gear on said driven shaft and a different-size gear fixed for rotation on said driven shaft and enmeshed with the ring gear on said drive shaft so as to thereby provide sets of constantly enmeshed gears of different gear ratios, a slide valve mounted in each of said shafts and having a valve port adapted for connection to a source of fluid under pressure and having a coupling position registering said valve port with said inlet port while restricting said discharge port and a decoupling position disconnecting said valve and inlet ports and opening said discharge port, and means connecting said slide valves and effecting successive movement thereof into a coupling position of one and a decoupling position of the other and vice versa so as to provide a shifting from one of said gear sets to the other.

9. In a gear shifting mechanism, drive and driven shafts of hollow form, a member mounted for rotation on each of said shafts and being formed with a plurality of circumferentially spaced axially extending open-ended cylinders and with passages connecting said cylinders to inlet and discharge ports at the internal periphery of its associated shaft, pistons mounted for reciprocation in said cylinders, an external ring gear journaled for rotation co-axially with each of said members and provided with an annular cam face extending across the cylinder ends for engagement with said pistons and being inclined to the axis so as to oscillate said pistons upon relative rotation of said ring gear and associated member, a gear fixed for rotation with said drive shaft and enmeshed with the ring gear on said driven shaft and a different-size gear fixed for rotation on said driven shaft and enmeshed with the ring gear on said drive shaft so as to thereby provide sets of constantly enmeshed gears of different gear ratios, a slide valve mounted in each of said shafts and having a valve port adapted for connection to a source of fluid under pressure and having a coupling position registering said valve port with said inlet port while restricting said discharge port and a decoupling position disconnecting said valve and inlet ports and opening said discharge port, a slide member connected to each of said slide valves and being carried for rotation with and for axial reciprocation by each of said shafts and projecting radially therefrom, and means connecting said slide members for joint reciprocation while permitting relative rotation of said slide members at different speeds and functioning to successively move said slide valves into a coupling position of one and a decoupling position of the other and vice versa so as to provide a shifting from one of said gear sets to the other.

10. In a gear shifting mechanism, drive and driven shafts, a plurality of sets of constantly enmeshed gears carried by said shafts for rotation therewith save one gear in each set being journaled for free rotation on one of said shafts, a plurality of fluid coupling means each connecting one of said last-mentioned gears and shafts and each including control means providing a range of torque transmission between relatively coupled and decoupled conditions, and means operatively connected to said control means to simultaneously decrease torque transmission in one fluid coupling means from coupled to uncoupled condition while increasing torque transmission in another fluid coupling means from decoupled to coupled condition to thereby effect shifting from one of said sets to another.

pressure fluid reservoir, and valve means connected to said source and reservoir and functioning to connect and disconnect said inlet passages to and from said source to charge said cylinders and to close said discharge passages to retain fluid in said cylinders and to open said discharge passages to said reservoir to release said fluid, said valve means providing in successive shift positions and ranges the following passage connections:

| Successive Shift Positions and Range | Fluid Coupling Means, First Gear Set | | Fluid Coupling Means, Second Gear Set | |
|---|---|---|---|---|
| | Inlet Passage | Discharge Passage | Inlet Passage | Discharge Passage |
| Neutral | Disconnected from source | Open to reservoir | Disconnected from source | Open to reservoir. |
| Shift to First Gear | Graduated from position disconnected from source to position connected to source. | Graduated from position open to reservoir to closed position. | do | Do. |
| Shift from First Gear to Second Gear. | Graduated from position connected to source to position disconnected from source. | Graduated from closed position to open to reservoir. | Graduated from position disconnected from source to connected to source. | Graduated from open to reservoir to closed position. | whereby the fluid coupling means for said first gear set will be gradually coupled in the movement of said valve means from neutral through the shift to first gear and will be gradually decoupled during the shift from first gear to second gear while said fluid coupling means for said second gear set is simultaneously being gradually coupled.

11. In a gear shifting mechanism, drive and driven shafts, a plurality of sets of constantly enmeshed gears carried by said shafts for rotation therewith save one free gear in each set being journaled for rotation on one of said shafts, a plurality of fluid coupling means each connecting one of said last-mentioned gears and shafts and composed of a member carried for rotation by one of said shafts and formed with a plurality of circumferentially spaced axially extending open-ended cylinders, pistons mounted for reciprocation in said cylinders, each of said free gears being associated with one of said members in co-axial relation and for relative rotation, said free gears having annular cam faces extending across the cylinder ends for engagement with said pistons and being inclined to the axis so as to oscillate said pistons upon relative rotation of said members and free gears, each of said members having inlet and discharge passages for the cylinders therein, and fluid supply and valving means connected to said passages and providing the connection of said source to the inlet passages of one coupling means while restricting said discharge passages thereof to thereby effect coupling of said means and in successive positions gradually disconnect said last-named inlet passage from said source while gradually lessening the restriction of said last-named discharge passage and simultaneously gradually connecting the other inlet passage to said source and gradually restricting said other discharge passage whereby one fluid coupling means will be gradually and progressively decoupled while the other fluid coupling means is gradually and progressively coupled.

12. In a gear shifting mechanism, drive and driven shafts, first and second sets of constantly enmeshed gears carried by said shafts for rotation therewith save one free gear in each set being journaled for rotation on one of said shafts, a plurality of fluid coupling means each connecting one of said last-mentioned gears and shafts and composed of a member carried for rotation by one of said shafts and formed with a plurality of circumferentially spaced axially extending open-ended cylinders, pistons mounted for reciprocation in said cylinders, each of said free gears being associated with one of said members in co-axial relation and for relative rotation, said free gears having annular faces extending across the cylinder ends for engagement with said pistons and being inclined to the axis so as to oscillate said pistons upon relative rotation of said members and free gears, each of said members having inlet and discharge passages for the cylinders therein, a source of fluid under pressure, a low 13. An automatic transmission comprising, input and output shafts, a plurality of sets of gears connected to said shafts and providing different gear ratios, a plurality of fluid couplings for said sets controlling torque transmission in each of said sets, a fluid pump adapted for connection to said input shaft and having an output pressure responsive to input shaft speed, a hydraulic shifter valve movable in a first direction through a plurality of stations energizing and de-energizing said fluid couplings to selectively engage said sets of gears in the order of increasing gear ratio and movable in a reverse direction through said stations selectively engaging said sets in the order of decreasing gear ratio, a double acting hydraulic actuator consisting of a cylinder and piston mounted for reciprocation therein and being connected to said shifter valve for movement thereof, passage means connecting said pump to the opposite ends of said cylinder for driving said piston and said shifter valve in said reverse directions, and a pressure responsive multiple position valve provided in said passage means and being responsive to said pump pressure to provide a plurality of positions corresponding to a plurality of predetermined input shaft speeds, a first of said positions functioning to open fluid flow to one end of said cylinder to provide movement of said piston in said first direction of said shifter valve, a second of said positions coresponding to a pre-determined lower input shaft speed closing off fluid flow to both ends of said cylinder for holding said piston against movement, a third of said positions corresponding to a further reduced input shaft speed functioning to open fluid flow to the opposite end of said cylinder to provide movement of said piston in said reverse direction of said shifter valve.

14. An automatic transmission as characterized in claim 13 wherein said pressure responsive valve includes a spring biasing said valve toward said third position and permitting said valve to move to said second and first positions with increasing fluid pressure, and means controlling the tension of said spring for changing the predetermined input shaft speeds corresponding to said positions.

15. An automatic transmission comprising, input and output shafts, a plurality of sets of gears connected to said shafts and providing different gear ratios, a plurality of fluid couplings for said sets controlling torque transmission in each of said sets, a fluid pump adapted for connection to said input shaft and having an output pressure responsive to input shaft speed, a hydraulic shifter valve connected to said pump and to said fluid couplings and movable in one direction through a plurality of stations energizing and deenergizing said fluid couplings to selectively engage said sets of gearing in the order of increasing gear ratio and movable in an opposite direction through said stations selectively engaging said sets in the order of decreasing gear ratio, a double acting hydraulic actuator consisting of a cylinder and piston mounted for reciprocation therein and being connected to said shifter valve for movement thereof, passage means connecting said pump to the opposite ends of said cylinder for driving said piston and said shifter valve in said reverse directions, a pressure responsive multiple position valve provided in said passage means and being responsive to said pump pressure to provide a plurality of positions corresponding to a plurality of predetermined input shaft speeds, a first of said positions functioning to open fluid flow to one end of said cylinder to provide movement of said piston in said first direction of said shifter valve, a second of said positions corresponding to a predetermined lower input shaft speed closing off fluid flow to both ends of said cylinder for holding said piston against movement, a third of said positions corresponding to a further reduced input shaft speed functioning to open fluid flow to the opposite end of said cylinder to provide movement of said piston in said reverse direction of said shifter valve, said pressure responsive valve including a spring biasing said valve toward said third position and permitting said valve to move to said second and first positions with increasing fluid pressure, means controlling the tension of said spring for changing the predetermined input shaft speeds corresponding to said positions and including a cylinder and piston mounted for reciprocation therein with the head end of said piston movable to and from the head end of said cylinder and the opposite end of said piston providing a rest for one end of said spring, and valve means connecting said pump to the head end of said last named cylinder for controlling the fluid pressure therein and the force exerted upon said spring.

16. An automatic transmission having input and output shafts and a plurality of sets of gears and fluid couplings connected to said shafts and providing upon selective energizing of said couplings for different gear ratios between said shafts; a hydraulic shifter valve controlling the operation of said couplings and movable in first and reverse directions to engage said gear sets in the order of increasing and decreasing ratio respectively; a hydraulic actuator for said valve; a control valve for said actuator having first and second positions providing for movement of said shifter valve in said first and reverse directions and an intermediate position holding said shifter valve against movement; and means displacing said control valve as a function of speed of said input shaft and comprising a hydraulic cylinder provided by said actuator, and first and second opposed pistons mounted for reciprocation therein to and from first and second head ends of said cylinder, said first piston being connected to said control valve, a spring mounted between said pistons and urging them toward said head ends and said control valve toward its first position, a fluid pump connected to said input shaft and having an output pressure responsive to the speed of said input shaft, a first passage connecting said pump to said first cylinder end for displacing said first piston toward said second position of said control valve against the resistance of said spring as a function of input shaft speed, said second piston having an exposed area in said cylinder larger than said first piston, a second passage connecting said pump to said second cylinder end, and valve means in said second passage for controlling fluid pressure in said second cylinder end and correspondingly the magnitude of resilient action of said spring against said first piston to control the response of the movement of said first piston to input shaft speed.

17. An automatic transmission as characterized in claim 16 wherein said input shaft is of hollow form to provide an internal bore wall having ports connected to said fluid couplings, said shifter valve being slidably mounted for reciprocation on said wall, and said hydraulic actuator including a piston slidably mounted for reciprocation on said bore wall and being connected to said shifter valve and being formed with the hydraulic cylinder for mounting said first and second pistons.

18. An automatic transmission as characterized in claim 16 wherein said hydraulic actuator receives its energizing fluid from said pump, and a pressure responsive flow limiting valve is provided in the fluid connection between said pump and hydraulic actuator for limiting the rate of displacement of said shifter valve at higher input shaft speeds.

19. An automatic transmission as characterized in claim 16 wherein said hydraulic actuator is composed of a cylinder and piston mounted for reciprocation therein to and from opposite head ends of said cylinder and said control valve functions in said first and second positions to selectively admit fluid under pressure to said head ends and in said intermediate position to block the exit of fluid from said last mentioned head ends, passage means connecting said last mentioned head ends and check valves biased to closed position in said first and second positions of said control valve but opening upon manual actuation of said last named piston to permit such manual actuation and the displacement of fluid caused thereby.

20. An automatic transmission as characterized in claim 16 for use with an internal combustion engine having an accelerator mounted for movement in one plane for controlling the flow of fuel to the engine, said accelerator being mounted for separate and conjoint movement in a second plane, and means connecting said last named valve means to said accelerate for operating said valve means to control the magnitude of the resilient action of said spring upon movement of said accelerator in said second plane.

21. An automatic transmission having input and output shafts and a plurality of sets of gears and fluid couplings connected to said shafts and providing upon selective energizing of said couplings for different gear ratios between said shafts; a hydraulic shifter valve controlling the operation of said couplings and movable in first and reverse directions to engage said gear sets in the order of increasing and decreasing ratio respectively; a hydraulic actuator for said valve; a control valve for said actuator having first and second positions providing for movement of said shifter valve in said first and reverse directions and an intermediate position holding said shifter valve against movement; and means displacing said control valve as a function of speed of said input shaft and comprising a hydraulic cylinder provided by said actuator, and first and second opposed pistons mounted for reciprocation therein to and from first and second head ends of said cylinder, said first piston being connected to said control valve, a spring mounted between said pistons and urging them toward said head ends and said control valve toward its first position, a fluid pump connected to said input shaft and having an output pressure responsive to the speed of said input shaft, a first passage connecting said pump to said first cylinder end for displacing said first piston toward said second position of said control valve against the resistance of said spring as a function of input shaft speed, said second piston having an exposed area in said cylinder larger than said first piston, said first piston providing an interior bore and being formed with passages connected to said pump and terminating in high and low pressure ports at the internal wall of said bore and having a third passage connected to said second cylinder end and terminating in a third port at said wall, and a slide valve mounted for reciprocation in said bore and constructed to provide in one position connection of said high pressure port and third port while restricting connection of said third port to said low pressure port to thereby apply fluid pressure in said second cylinder end controlling the resilient action of said spring and correspondingly the response of movement of said first piston to input shaft speed, said slide valve providing in ensuing positions a progressive reduction of the area of connection between said high pressure port and third port while increasing the area of connection of said third port and low pressure port so as to reduce the resilient action of said spring.

22. An automatic transmission comprising, input and output shafts, a plurality of sets of constantly enmeshed gears carried by said shafts for rotation therewith save one gear in each set being journaled for free rotation on one of said shafts, a plurality of fluid couplings each connecting one of said last mentioned free journaled gears and shafts, a hydraulic shifter valve controlling the operation of said couplings and movable in first direction through a plurality of stations energizing and de-energizing said fluid couplings to selectively engage said sets of ears in the order of increasing gear ratio and movable in an opposite direction through said stations to selectively engage said sets in the order of decreasing gear ratio, said shifter valve functioning on movement between said stations to progressively de-energize one of said couplings while progressively energizing another of said couplings whereby both function partially between said last mentioned stations, a hydraulic actuator connected to said valve, a control valve for said actuator having first and second positions providing for movement of said actuator and said shifter valve in said first and opposite directions, means responding to the speed of said input shaft to displace said control valve to said first position at a predetermined speed of said input shaft and functioning to displace said control valve to its said second position at a predetermined higher speed of said input shaft, and a homing device connected to said shifter valve and functioning when between said stations to urge said shifter valve to the nearest of said stations and releasably holding said shifter valve therein so as to thereby deter hunting of the mechanism.

23. An automatic transmission comprising, input and output shafts, a plurality of sets of constantly enmeshed gears carried by said shafts for rotation therewith save one gear in each set being journaled for free rotation on one of said shafts, a plurality of fluid couplings each connecting one of said last mentioned free journaled gears and shafts, a hydraulic shifter valve controlling the operation of said couplings and including a housing member and a valve member movable therein in a first direction through a plurality of positions energizing and de-energizing said fluid couplings to selectively engage said sets of gears in the order of increasing gear ratio and movable in an opposite direction through said positions to selectively engage said sets in the order of decreasing gear ratio, said shifter valve member functioning on movement between said positions to progressively de-energize one of said couplings while progressively energizing another of said couplings whereby both function partially between said last mentioned positions, means responding to the speed of said input shaft to displace said shifter valve member in said first direction as a function of decreased speed of said input shaft and in said opposite direction as a function of increased speed of said input shaft, one of said members being formed with a plurality of sockets corresponding in number to the number of said positions of said shifter valve member, and a detent member biased into engagement with said sockets at said positions and releasably holding said valve member thereat so as to thereby deter hunting of the mechanism.

24. An automatic transmission comprising, input and output shafts, a plurality of gear sets and fluid coupling means connecting said shafts and providing a plurality of drive ratios therebetween, a hydraulic shifter valve controlling the operation of said coupling means and movable in a first direction through a plurality of positions energizing and de-energizing said coupling means to selectively engage said gear sets in the order of increasing gear ratio and movable in an opposite direction through said positions to selectively engage said sets in the order of decreasing gear ratio, said shifter valve functioning on movement between said positions to progressively de-energize one of said coupling means while progressively energizing another of said coupling means wheereby both function partially between said last mentioned positions, means responding to the speed of said input shaft to displace said shifter valve in said first direction as a function of decreased speed of said input shaft and in said opposite direction as a function of increased speed of said input shaft, and timing means limiting the rate of movement of said shifter valve between said positions.

25. An automatic transmission as characterized in claim 24 wherein said timing means is coordinated with the speed of said input shaft so as to decrease said rate of movement of said shifter valve between said positions at higher input shaft speeds.

26. An automatic transmission as characterized in claim 24 wherein said timing means consists of relatively movable cam and follower parts arranged with one of said parts connected to said shifter valve for movement therewith, one of said parts including a hydraulic cylinder and a piston mounted for reciprocation therein in response to relative movement of said parts and of said shifter valve, and fluid flow restricting means connected to said cylinder for limiting the rate of movement of said piston and accordingly the rate of movement of said shifter valve between said positions.

27. An automatic transmission as characterized in claim 24 wherein said timing means consists of a cam and a cam follower connected for movement with said shifter valve, said cam follower including a hydraulic cylinder and a piston mounted for reciprocation therein in response to movement of said follower on said cam with said shifter valve, a fluid pump connected to said input shaft and having a discharge pressure proportional to the speed of rotation of said input shaft, and passage means connecting said pump and cylinder and including a flow-restricting orifice limiting the rate of movement of said piston and accordingly the rate of movement of said shifter valve between said positions and functioning to reduce said rate of movement at higher input shaft speeds.

28. An automatic transmission as characterized in claim 24 wherein said timing means includes a centrifugally operated part mounted for rotation with said input shaft and functioning to decrease said rate of movement of said shifter valve between said positions at higher input shaft speeds.

29. An automatic transmission as characterized in claim 24 wherein said timing means consists of relatively movable cam and follower parts arranged with one of said parts connected to said shifter valve for movement therewith, one of said parts including a hydraulic cylinder rotatable with said input shaft and a piston mounted for reciprocation therein in response to relative movement of said parts and of said shifter valve, and fluid flow restricting means connected to said cylinder for limiting the rate of movement of said piston, said piston being responsive to centrifugal force and cooperating with said flow restricting means for limiting the rate of movement of said shifter valve between said positions.

30. An automatic transmission comprising, input and output shafts, a plurality of gear sets and fluid coupling means connecting said shafts and providing a plurality of drive ratios therebetween, a hydraulic shifter valve controlling the operation of said coupling means and movable in a first direction through a plurality of positions energizing and deenergizing said coupling means to selectively engage said gear sets in the order of increasing gear ratio and movable in an opposite direction through said positions to selectively engage said sets in the order of decreasing gear ratio, means responding to the speed of said input shaft to displace said shifter valve in said first direction as a function of decreased speed of said input shaft and in said opposite direction as a function of increased speed of said input shaft, and a remote indicator mechanism connected to said shifter valve for showing the position thereof and having a part adapted for manual engagement and displacement for moving said shifter valve to said positions to provide manual shifting of said transmission.

31. An automatic transmission comprising, input and output shafts, a plurality of gear sets and fluid coupling means connecting said shafts and providing a plurality of drive ratios therebetween, a hydraulic shifter valve controlling the operation of said coupling means and movable in a first direction through a plurality of positions energizing and de-energizing said coupling means to selectively engage said gear sets in the order of increasing gear ratio and movable in an opposite direction through said positions to selectively engage said sets in the order of decreasing gear ratio, means responding to a predetermined range of speed of said input shaft to displace said shifter valve in said first direction at the lower speed of said range and in said opposite direction at the higher speed of said range, means controlling the speed range at which said last named means functions, an accelerator for an internal combustion engine adapted for connection to said input shaft, said accelerator being mounted for movement in one plane for controlling the flow of fuel to the engine and being mounted for separate and conjoint movement in a second plane, and means connecting said last named means to said accelerator for operating said last named means to control said speed range upon movement of said accelerator in said second plane.

32. An automatic transmission comprising, input and output shafts, a plurality of gear sets and fluid couplings connecting said shafts and providing a plurality of drive ratios therebetween and including a reversing gear movable into and out of mesh, a hydraulic shifter valve controlling the operation of said couplings and movable in a first direction through a plurality of positions energizing and de-energizing said couplings to selectively engage said gear sets in the order of decreasing gear ratio starting from a decoupled neutral position and movable in an opposite direction through said positions to selectively engage said sets in the order of increasing gear ratio and to said neutral position, first means responding to a predetermined range of speed of said input shaft to displace said shifter valve in said first and opposite directions at the terminal speeds of said range, second means controlling the speed range at which said first means functions, an accelerator for an internal combustion engine adapted for connection to said input shaft, said accelerator being mounted for movement in one plane for controlling the flow of fuel to the engine and being mounted for separate and conjoint movement in a second plane and being connected to said second means for controlling said speed range upon movement of said accelerator in said second plane, said accelerator having a neutral position holding said shifter valve in neutral position at all speeds of said input shaft, a solenoid controlling said movement of said reversing gear, and a switch connected to said solenoid and being connected for closing only upon movement of said shifter valve to said neutral position.

33. An automatic transmission as characterized in claim 32 and including an electric operated latch means connected electrically in the circuit of said solenoid and functioning when said shifter valve is in reverse gear position to engage and retain said shifter valve from movement in said first direction.

34. An automatic transmission for an internal combustion engine, an ignition switch for said engine having "on," "off," and "reverse" positions, said transmission having a plurality of forward speed positions and a reverse position, means automatically upshifting said transmission through said forward speed positions with increased engine speed and downshifting through said positions and to said reverse position upon decreased engine speed, a movable reverse gear having operable and inoperable positions, a spring normally holding said reverse gear in inoperable position, and a solenoid connected to said gear and functioning when energized to move said gear in operable position against the resistance of said spring, said solenoid being electrically connected to the reverse position of said switch.

35. An automatic transmission as characterized in claim 34 and including an electric operated latch means connected electrically in the circuit of said solenoid for energizing therewith upon movement of said ignition switch to reverse position and functioning when energized and with said transmission in reverse gear position to hold said shifting means from movement out of reverse position and into said forward speed positions.

36. An automatic transmission for an internal combustion engine having a plurality of forward speeds and a neutral position, shifter means functioning automatically to upshift said transmission from neutral position through said forward speed positions in response to increased engine speed and functioning to downshift said transmission through said forward speed positions and to neutral position in response to decreased engine speed, an accelerator pedal for said engine mounted for movement in one plane for controlling the flow of fuel to the engine and being mounted for separate and conjoint movement in a second plane, and means connected to said pedal and operated thereby upon movement in said second plane to prevent downshifting of said transmission to neutral position.

37. An automatic transmission for an engine driven vehicle comprising, a transmission shiftable into a plurality of forward speed gear ratios, a governor responsive to engine speed and connected to said transmission for effecting a correlation between engine speed and up-shifting of said transmission and pendulum means responsive to the grade encountered by the vehicle for increasing the engine speed in the aforesaid correlation as a function of increased grade encountered.

38. An engine driven vehicle having a spring mounted body assuming a load responsive position, a transmission shiftable in a plurality of forward speed gear ratios, a governor responsive to engine speed and connected to said transmission for effecting a correlation between engine speed and up-shifting of said transmission, and means connected to said body and responsive to the position thereof for increasing the engine speed in the aforesaid correlation as a function of increased load encountered.

39. An automatic transmission for an engine driven vehicle comprising, a transmission shiftable into a plurality of forward speed gear ratios, a governor responsive to engine speed and connected to said transmission for effecting the correlation between engine speed and up-shifting of said transmission, fluid motive means connected to said governor for controlling said correlation, and fluid having a thermal coefficient of expansion connected to and operating said motive means for increasing the engine speed in said correlation as a function of decreased temperature.

40. An engine driven vehicle having a spring mounted body assuming a load responsive position, a transmission shiftable into a plurality of forward speed gear ratios, a governor responsive to engine speed and connected to said transmission for effecting a correlation between engine speed and up-shifting of said transmission, fluid motive means connected to said governor for controlling said correlation, pendulum operated fluid pump means responsive to the grade encountered by said vehicle, a second fluid pump means connected to said body and responsive to the position thereof, and a common fluid circuit connecting said pendulum pump means and said second pump means to said fluid motive means and containing an operating fluid having a thermal coefficient of expansion and being connected to and operating said motive means to thereby increase the engine speed in said correlation as a function of increased grade and increased load and decreased temperature.

References Cited in the file of this patent
UNITED STATES PATENTS

| | | |
|---|---|---|
| 1,199,640 | Vincent | Sept. 26, 1916 |
| 1,357,756 | Williamson | Nov. 2, 1920 |
| 1,679,036 | Igou | July 31, 1928 |
| 1,893,644 | Fleischel | Jan. 10, 1933 |
| 1,979,488 | Perez | Nov. 6, 1934 |
| 1,993,544 | Fleischel | Mar. 5, 1935 |
| 1,995,646 | Paterson | Mar. 26, 1935 |
| 2,025,472 | Perry | Dec. 24, 1935 |
| 2,083,907 | Harrigan | June 15, 1937 |
| 2,094,418 | Swanson | Sept. 28, 1937 |
| 2,102,781 | Bieretz | Dec. 21, 1937 |
| 2,106,720 | Chantry | Feb. 1, 1938 |
| 2,218,558 | Staats | Oct. 22, 1940 |
| 2,430,799 | Aspinwall | Nov. 11, 1947 |
| 2,432,166 | Mallory | Dec. 6, 1947 |
| 2,457,692 | La Brie | Dec. 28, 1948 |
| 2,511,039 | Black et al. | June 13, 1950 |
| 2,618,164 | Schneider | Nov. 18, 1952 |
| 2,630,893 | Misch et al. | Mar. 10, 1953 |